United States Patent
Yamaura et al.

(10) Patent No.: US 9,130,957 B2
(45) Date of Patent: Sep. 8, 2015

(54) DATA COMMUNICATION APPARATUS AND METHOD

(75) Inventors: Takahiro Yamaura, Kawasaki (JP);
Shingo Tanaka, Yokohama (JP);
Nobuhiko Sugasawa, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 283 days.

(21) Appl. No.: 13/013,034

(22) Filed: Jan. 25, 2011

(65) Prior Publication Data
US 2011/0225308 A1    Sep. 15, 2011

(30) Foreign Application Priority Data

Mar. 9, 2010   (JP) .................................. 2010-51600

(51) Int. Cl.
| | |
|---|---|
| G06F 15/16 | (2006.01) |
| H04L 29/12 | (2006.01) |
| H04L 29/08 | (2006.01) |
| H04L 29/06 | (2006.01) |

(52) U.S. Cl.
CPC ........ H04L 61/103 (2013.01); H04L 29/12028 (2013.01); H04L 67/146 (2013.01); H04L 69/161 (2013.01); H04L 69/163 (2013.01)

(58) Field of Classification Search
USPC ........................................................ 709/228
See application file for complete search history.

(56) References Cited

U.S. PATENT DOCUMENTS

| | | | | |
|---|---|---|---|---|
| 5,282,205 A * | 1/1994 | Kuznicki | ...................... | 370/429 |
| 2005/0190787 A1* | 9/2005 | Kuik et al. | ................... | 370/466 |
| 2005/0246450 A1* | 11/2005 | Enko et al. | ..................... | 709/230 |
| 2006/0168274 A1* | 7/2006 | Aloni et al. | .................... | 709/230 |
| 2008/0133798 A1* | 6/2008 | Park et al. | ....................... | 710/54 |
| 2009/0248891 A1 | 10/2009 | Tanaka | | |

(Continued)

FOREIGN PATENT DOCUMENTS

| | | |
|---|---|---|
| JP | 2005-316629 | 11/2005 |
| JP | 2006-031145 | 2/2006 |

(Continued)

OTHER PUBLICATIONS

Rfc 793, Transmission Control Protocol, Sep. 1981, http://tools.ietf.org/pdf/rfc793.pdf.*

(Continued)

*Primary Examiner* — Andrew Nalven
*Assistant Examiner* — Khang Do
(74) *Attorney, Agent, or Firm* — Amin, Turocy & Watson, LLP

(57) ABSTRACT

In one embodiment, a data communication apparatus includes a plurality of communications units for performing transmission and reception with the plurality of different networks, a first storage unit which stores a first identifier and a second identifier, a first processing unit which performs network protocol processing with hardware, and a second processing unit which performs network protocol processing with software. The first identifier indicates a communication unit which receives a frame, and the second identifier indicates a communication unit which transmits a frame. The first processing unit stores the first identifier in association with a reception frame in the first storage unit, and the second processing unit reads the first identifier and the reception frame from the first storage unit, generates a transmission frame as a response to the reception frame, stores the first identifier as the second identifier in association with the transmission frame in the first storage unit.

12 Claims, 14 Drawing Sheets

(56) References Cited

U.S. PATENT DOCUMENTS

| | | |
|---|---|---|
| 2010/0074211 A1* | 3/2010 | Kim et al. .................... 370/329 |
| 2010/0115387 A1 | 5/2010 | Tanaka |
| 2010/0296449 A1* | 11/2010 | Ishii et al. .................... 370/328 |
| 2012/0027027 A1 | 2/2012 | Yamaura et al. |

FOREIGN PATENT DOCUMENTS

| | | |
|---|---|---|
| JP | 2008-295041 | 12/2008 |
| JP | 2009-053770 | 3/2009 |
| WO | 03/105421 A1 | 12/2003 |

OTHER PUBLICATIONS

Japanese Office Action for Japanese Application No. 2010-051600 mailed on Apr. 20, 2012.

Japanese Office Action for Japanese Application No. 2010-051600 mailed on Jan. 31, 2012.

* cited by examiner

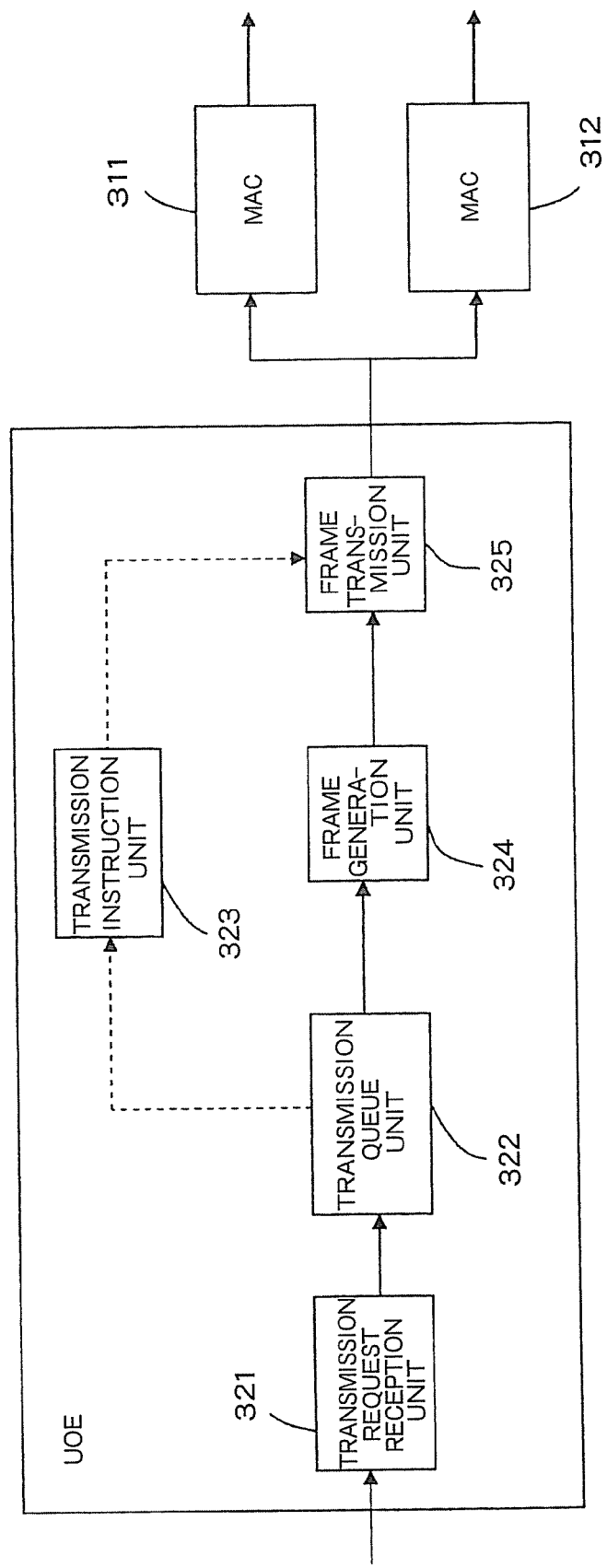
F I G. 9

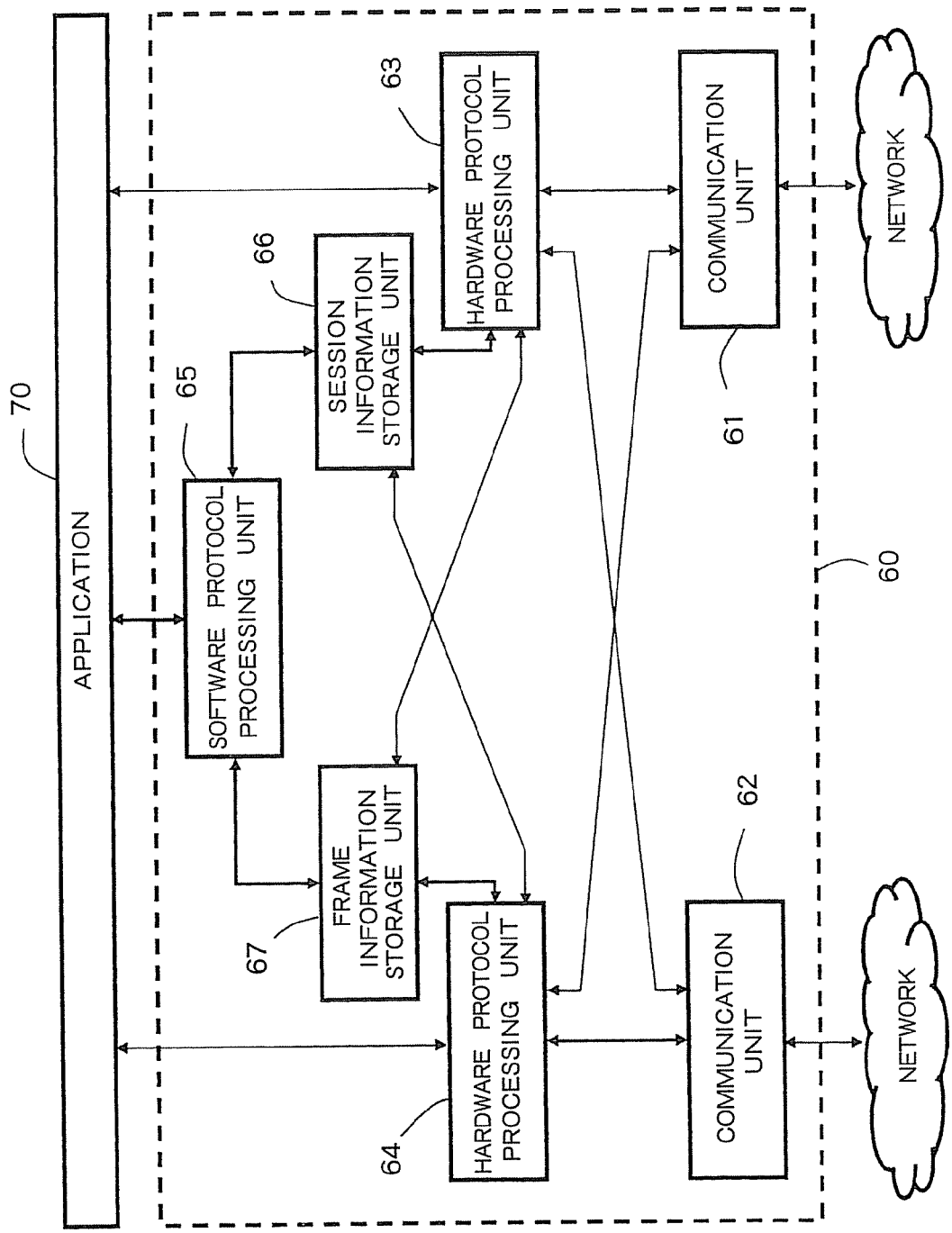
F I G. 11

DATA COMMUNICATION APPARATUS AND METHOD

CROSS REFERENCE TO RELATED APPLICATION

This application is based upon and claims benefit of priority from the Japanese Patent Application No. 2010-51600, filed on Mar. 9, 2010, the entire contents of which are incorporated herein by reference.

FIELD

Embodiments described herein relate generally to a data communication apparatus and a data communication method.

BACKGROUND

In the Internet communication, TCP/IP (Transmission Control Protocol/Internet Protocol) is widely used. Reception processing and transmission processing of TCP/IP is executed by software operating on a CPU (Central Processing Unit). However, with recent remarkable advancement in a network speed, processing load of software has increased.

It is suggested a data reception apparatus that achieves high speed communication processing by processing TCP/IP protocol with dedicated hardware and reducing the TCP/IP protocol processing performed by a CPU.

Since the above data reception apparatus is connected to a network via apparatuses such as a repeater, a bridge, a switching hub, a router, it is necessary to solve malfunction if there is any malfunction in these apparatuses. In particular, when the data reception apparatus is used as an industrial apparatus and in a social infrastructure, a network failure in a communication path caused by malfunction of these apparatuses would result in a serious problem. Accordingly, for example, a plurality of communication paths which are connected to different apparatuses respectively are prepared to improve the reliability.

It is suggested a communication apparatus for improving the reliability while achieving high speed communication, wherein the communication apparatus includes a plurality of NICs (Network Interface Cards) each having a hardware offload engine, and when one of the NICs fails, failover with another NIC occurs.

However, the above communication apparatus needs to have as many NICs each having the hardware offload engine as the number of communication paths. This causes a problem that the cost increases.

BRIEF DESCRIPTION OF THE DRAWINGS

FIG. 9 is a block diagram illustrating an example of a configuration of a UOE;

FIG. 11 is a schematic configuration diagram illustrating a data communication according to the fourth embodiment of the present invention;

DETAILED DESCRIPTION

According to one embodiment, a data communication apparatus includes a communication unit configured to transmit a transmission frame and receive a reception frame via a plurality of networks, a storage unit configured to store a first identifier indicating by way of which of the plurality of networks the communication unit has received a reception frame or a second identifier indicating by way of which of the plurality of networks the communication unit transmits a transmission frame, a hardware protocol processing unit, and a software processing unit. The hardware protocol processing unit performs protocol processing on the reception frame to write the first identifier to the storage unit, and perform the protocol processing on the transmission frame to reads the second identifier from the storage unit. The software protocol processing unit performs the protocol processing on the transmission frame to write the second identifier to the storage unit, and perform the protocol processing on the reception frame to reads the first identifier from the storage unit.

Embodiments of the present invention will be explained with reference to the drawings.

(First Embodiment)

Figure 1:
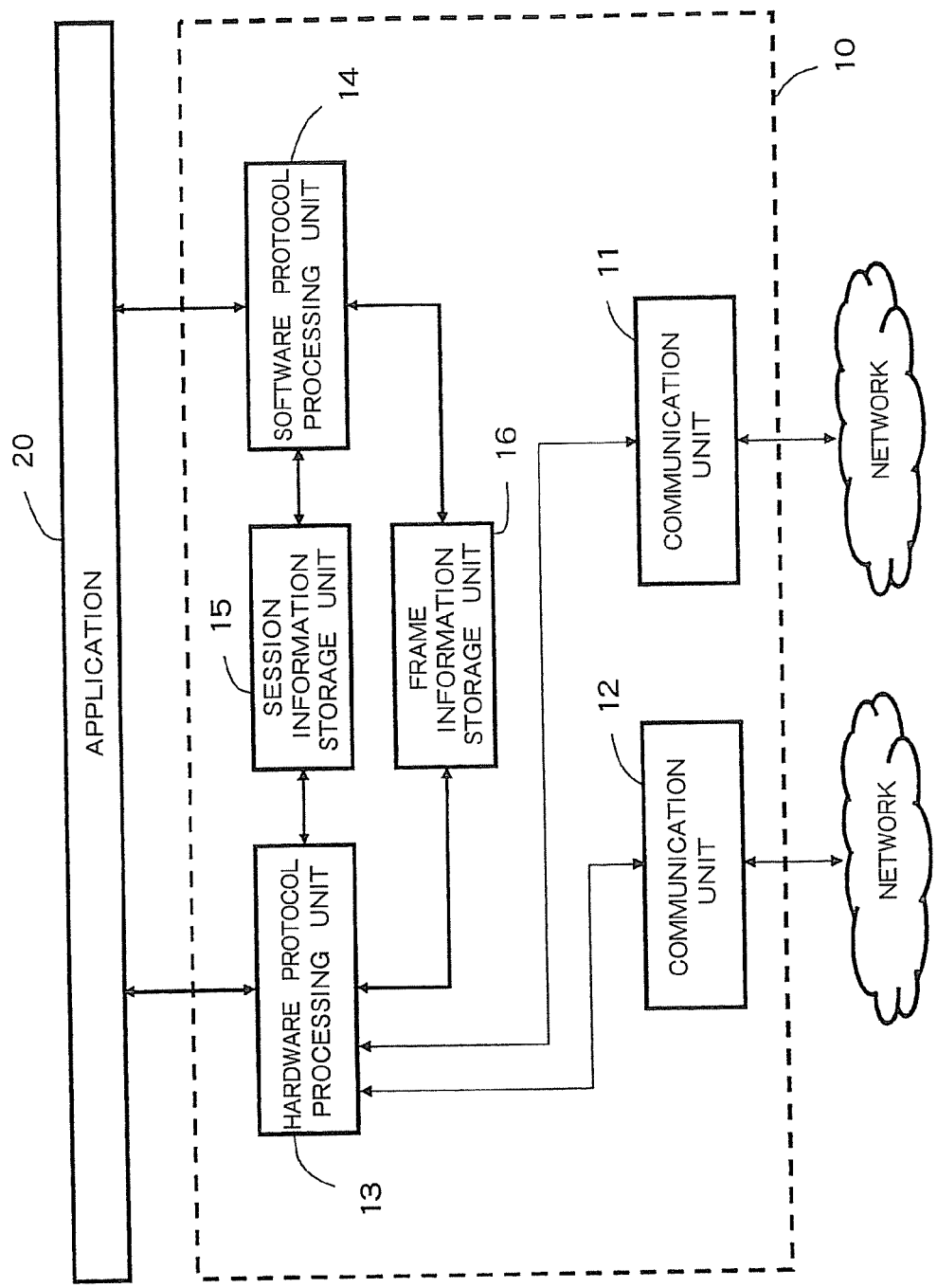
FIG. 1 is a schematic configuration diagram illustrating a data communication apparatus according to the first embodiment of the present invention.

FIG. 1 illustrates a schematic configuration of a data communication apparatus according to the first embodiment of the present invention. In the explanation below, a unit of data handled in a data link layer is referred to as a frame. In a network layer, it is referred to as a packet. In a case of TCP in a transport layer, it is referred to as a segment. In a case of UDP in the transport layer, it is referred to as a datagram.

A data communication apparatus 10 includes communication units (such as media access control) 11, 12, a hardware protocol processing unit 13, software protocol processing units 14, a session information storage unit 15, and a frame information storage unit 16.

The communication units 11, 12 are each connected to different networks. The communication units 11, 12 receive frames from the networks, and transmit frames to the networks. The network referred to herein means a network in which TCP/IP can be used as a protocol in a higher-level layer. Examples of networks include wired networks, i.e., Ethernet standards such as gigabit Ethernet (registered trademark), 10 gigabit Ethernet, 40 gigabit Ethernet, and 100 gigabit Ethernet, and wireless networks defined by IEEE802.11b/g/a/n, and a mixed network including not only a wired network but also a wireless network.

The hardware protocol processing unit 13 is dedicated hardware for carrying out network protocol processing (for example, TCP/IP protocol processing) to transfer data with an application 20. The hardware protocol processing unit 13 is achieved by a TOE (TCP/IP Offload Engine). The hardware protocol processing unit 13 includes Ethernet processing function, IPv4 (Internet Protocol Version 4) processing function except for routing function, and TCP data processing function.

Herein, the Ethernet processing means Ethernet reception processing and Ethernet transmission processing. The Ethernet reception processing includes verification processing of FCS (Frame Check Sequence) of a received Ethernet frame, analysis processing of a destination MAC address of an Ethernet header, analysis processing of a source MAC address, and analysis processing of a type representing a higher-level protocol. On the other hand, the Ethernet transmission processing includes setting of a destination MAC address of an Ethernet header, setting of a source MAC address, setting of a type representing a higher-level protocol, and calculation of FCS.

The IPv4 processing includes IPv4 reception processing and IPv4 transmission processing. The IPv4 reception processing includes verification processing of a checksum of an IPv4 header, analysis of version, header length, type of service, packet length, identifier, control flag, fragment offset, time to live, protocol number, source IP address, and destination IP address of the IPv4 header, and reassembly processing of fragmented packets. On the other hand, the IPv4 transmission processing includes setting of version, header length, type of service, packet length, identifier, control flag, fragment offset, time to live, protocol number, source IP address, and destination IP address of an IPv4 header, calculation of a checksum of the IPv4 header, and fragmentation processing.

The TCP data processing includes TCP reception processing and TCP transmission processing. The TCP reception processing includes analysis of source port number, destination port number, sequence number, acknowledgement number, data offset, control flag, window size, and urgent pointer of a TCP header, and verification of a checksum of TCP. When a session has been established, segments are joined, and data are transferred to an application. If necessary, an acknowledgement segment is generated and transmitted.

In the TCP data transmission processing, when a session has been established, segments are divided if necessary, and the following processings are performed: setting of source port number, destination port number, sequence number, acknowledgement number, data offset, control flag, window size, and urgent pointer of a TCP header, and TCP checksum calculation, segment dividing/joining processing, and transmission processing of acknowledgement segment.

The software protocol processing unit 14 achieves network protocol processing with software operating on a CPU (Central Processing Unit). The software protocol processing unit 14 includes ARP (Address Resolution Protocol) processing function, routing processing function, and TCP session management processing function.

Herein, the ARP processing function includes ARP reception processing and ARP transmission processing. The ARP reception processing includes analysis of fields including hardware address format, protocol address format, hardware address length, protocol address length, operation, source MAC address, source IP address, target MAC address, and target IP address of an ARP header. In the ARP reception processing, a response packet is generated if necessary.

The ARP transmission processing includes setting of fields including hardware address format, protocol address format, hardware address length, protocol address length, operation, source MAC address, source IP address, target MAC address, and target IP address of an ARP header.

The routing processing function manages a routing table storing a relationship between destination IP addresses and interfaces of the communication units 11, 12. The routing processing function is a function for referring to this table and determining one of interfaces of the communication units 11, 12 for output when a packet is transmitted to the destination IP address.

The TCP session management processing includes TCP header analysis processing and TCP header setting processing of a segment including RST flag, SYN flag, and FIN flag for establishing and terminating TCP session, and a response segment in response to the segment.

The session information storage unit 15 stores TCP session information. Therefore, the TCP session information can be shared by the hardware protocol processing unit 13 and the software protocol processing unit 14. Herein, the TCP session information is connection information distinguished by an IP address and a port number of a source apparatus and an IP address and a port number of a destination apparatus. Herein, the TCP session information includes sequence number, window size, MAC address, identification information indicating a network to which a session in question belongs to, and the like, which are needed by the hardware protocol processing unit 13 and the software protocol processing unit 14 to perform TCP processing in cooperation with each other.

The frame information storage unit 16 stores information about a reception frame and a transmission frame. One of the hardware protocol processing unit 13 and the software protocol processing unit 14 writes information to the frame information storage unit 16, and the other of the hardware protocol processing unit 13 and the software protocol processing unit 14 reads the information therefrom. Therefore, the hardware protocol processing unit 13 and the software protocol processing unit 14 can exchange information about the reception frame and the transmission frame.

The session information storage unit 15 and the frame information storage unit 16 can be achieved with a shared memory connected to the hardware protocol processing unit (TOE) 13 and the software protocol processing unit (CPU) 14 via a bus.

Figure 2:
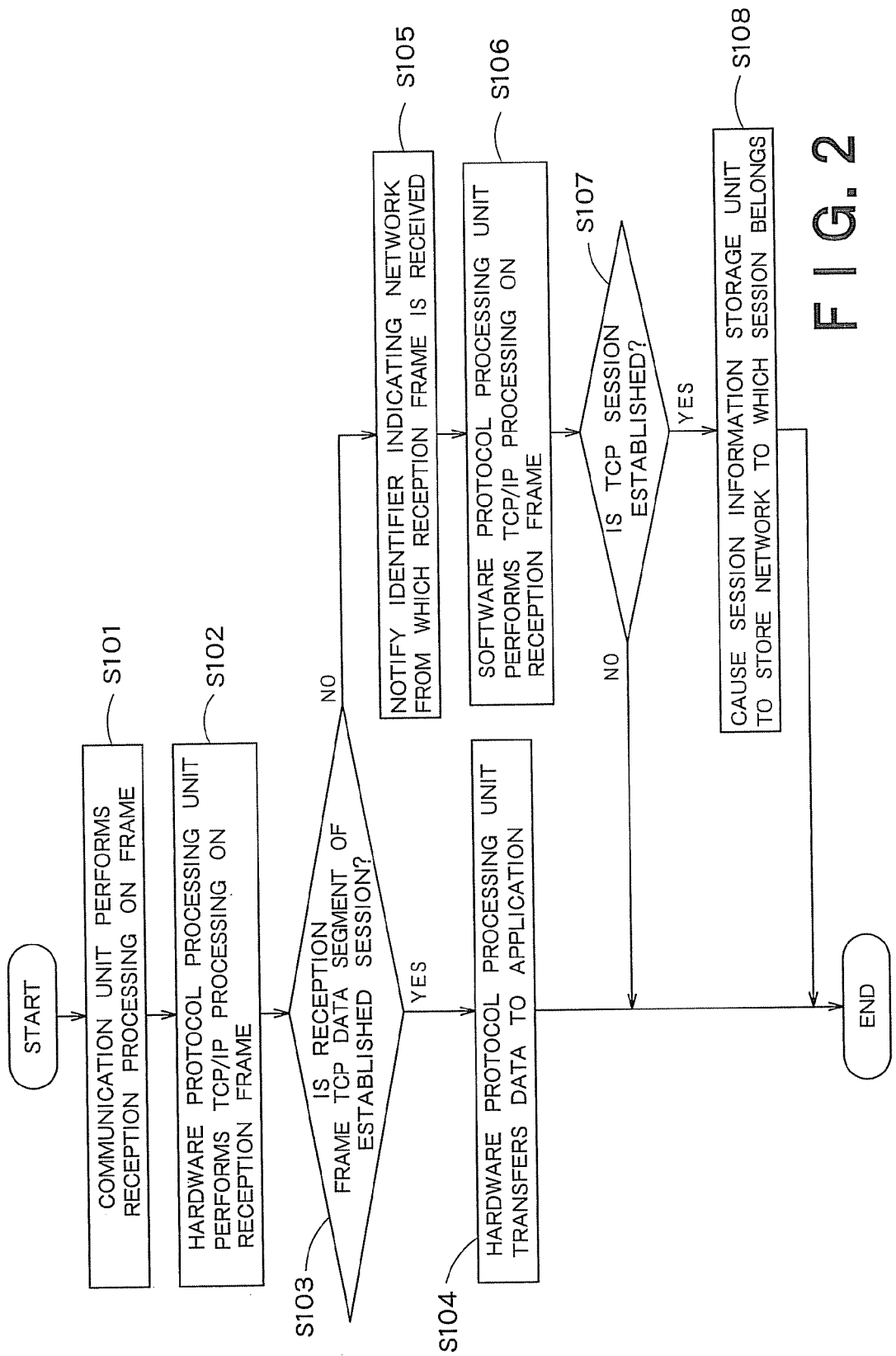
FIG. 2 is a flowchart illustrating reception processing performed by the data communication apparatus according to the first embodiment.

Subsequently, the reception processing performed by the data communication apparatus 10 will be explained with reference to a flowchart as illustrated in FIG. 2.

(Step S101) The communication units 11, 12 receive frames from the networks.

(Step S102) The hardware protocol processing unit 13 performs Ethernet reception processing of the reception frame, IPv4 reception processing, and TCP reception data processing.

(Step S103) A determination is made as to whether the reception frame is a TCP segment and is a TCP data segment in an already established session. If it is determined that the reception frame is a TCP segment and is a TCP data segment in an already established session, step S104 is performed. If not, step S105 is subsequently performed.

(Step S104) The hardware protocol processing unit 13 transfers data to the application 20.

(Step S105) The hardware protocol processing unit 13 notifies the software protocol processing unit 14 of an identifier indicating which of the interfaces of the communication units 11, 12 the reception frame is received from. More specifically, the hardware protocol processing unit 13 writes the identifier to the frame information storage unit 16. The software protocol processing unit 14 reads the identifier from the frame information storage unit 16.

(Step S106) The software protocol processing unit 14 performs TCP/IP processing of the reception frame.

(Step S107) If the reception frame is a response segment in reply to a TCP segment including a SYN flag transmitted by the data communication apparatus 10 itself, and where a session is established as a result of the processing, step S108 is subsequently performed. If the reception segment is a TCP segment other than the response segment, an ARP packet, and the like, and where a session is not established, the processing is finished.

(Step S108) The software protocol processing unit 14 reads information about a network to which the session in question belongs to, i.e., information about an interface of a communication unit to which the session in question belongs from the frame information storage unit 16, and writes the information to the session information storage unit 15.

Figure 3:
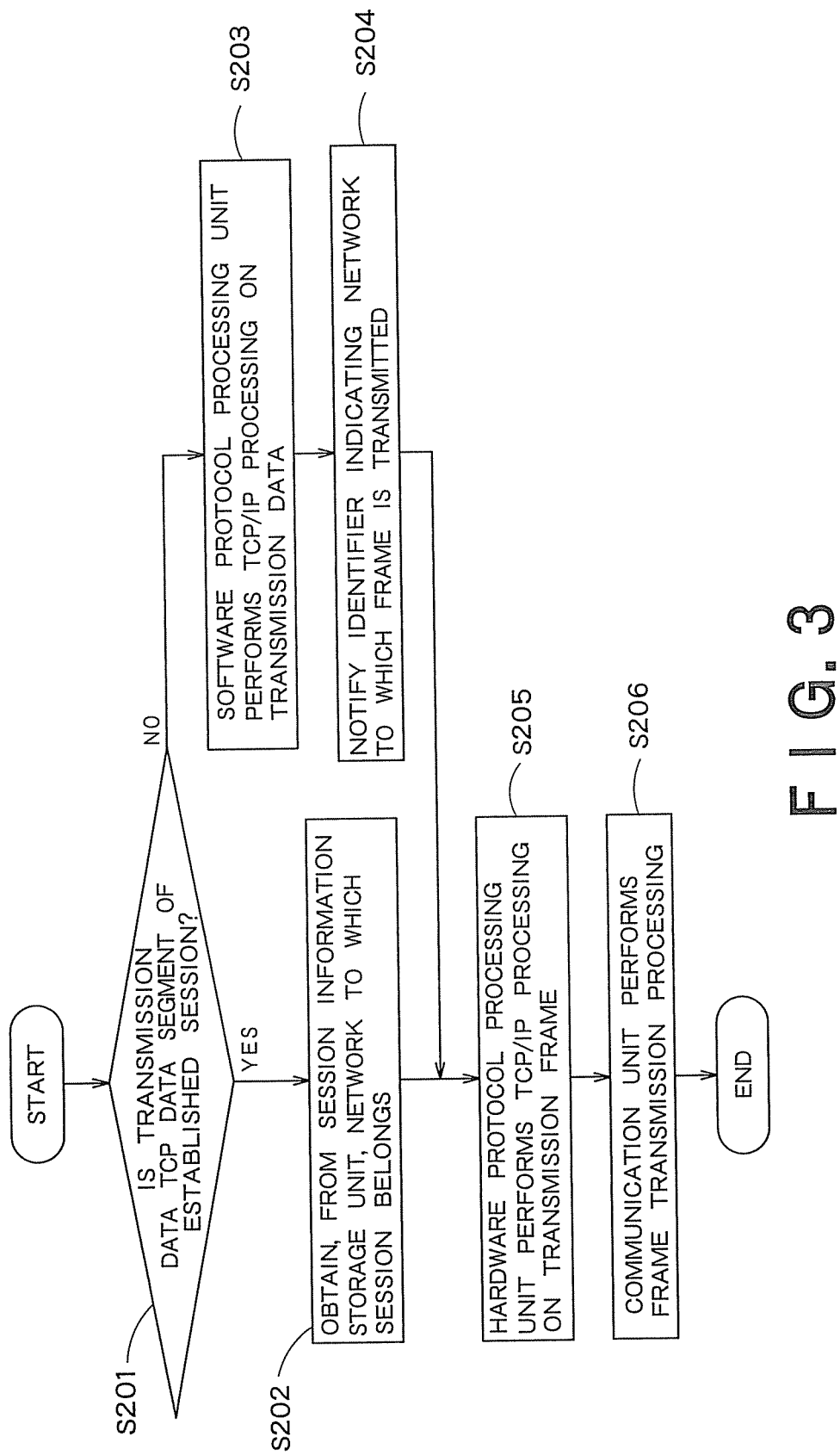
FIG. 3 is a flowchart illustrating transmission processing performed by the data communication apparatus according to the first embodiment.

Subsequently, the transmission processing performed by the data communication apparatus 10 will be explained with reference to a flowchart as illustrated in FIG. 3.

(Step S201) The hardware protocol processing unit 13 refers to the information stored in the session information storage unit 15 to determine whether the transmission data belongs to the session currently established. If the transmission data is TCP data for the session currently established, step S202 is subsequently performed. If the transmission data is not TCP data for the session currently established but is an ARP packet, a TCP segment including a SYN flag for establishing a TCP session, and the like, step S203 is subsequently performed.

(Step S202) The hardware protocol processing unit 13 obtains, from the session information storage unit 15, an identifier indicating the interface of the communication unit to which the session belongs.

(Step S203) The software protocol processing unit 14 performs TCP/IP processing of protocols which are not processed by the hardware protocol processing unit 13.

(Step S204) The software protocol processing unit 14 has a routing processing function, and determines a network segment to which the transmission data is to be transmitted based on the destination IP address, i.e., an interface of a communication unit by way of which the transmission data is to be transmitted. Then, the software protocol processing unit 14 notifies the hardware protocol processing unit 13 of the identifier indicating the interface of the communication unit performing the data transmission. More specifically, the software protocol processing unit 14 writes the identifier to the frame information storage unit 16, and the hardware protocol processing unit 13 reads the identifier from the frame information storage unit 16.

(Step S205) The hardware protocol processing unit 13 performs TCP transmission data processing, IPv4 transmission processing, and Ethernet transmission processing. If the software protocol processing unit 14 performs protocol processing, the hardware protocol processing unit 13 performs TCP/IP processing of transmission frames which are not processed by the software protocol processing unit 13.

(Step S206) The communication unit 11 or 12 transmits frames to a destination apparatus.

Figure 4:
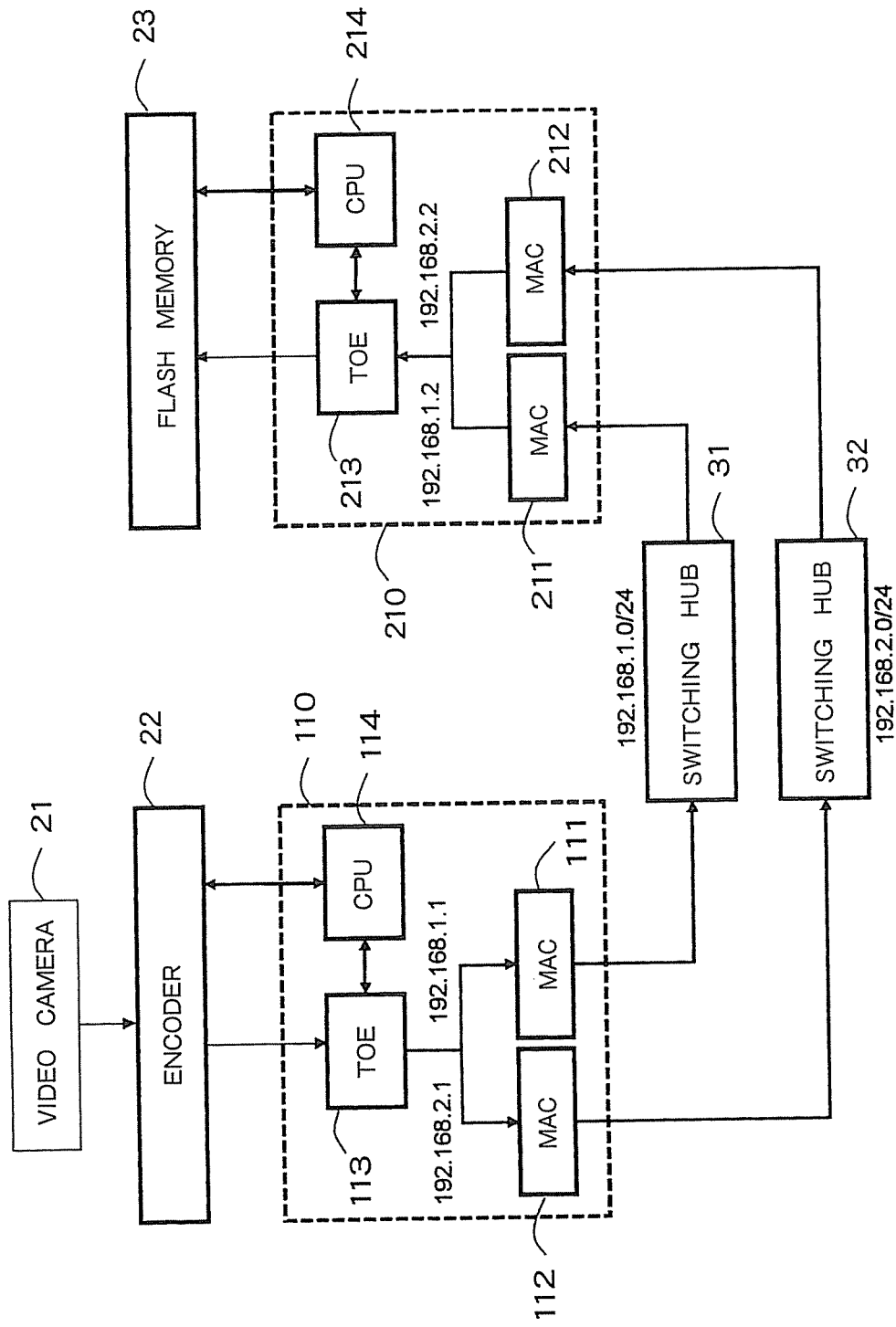
FIG. 4 is a schematic configuration diagram illustrating a data communication system according to the first embodiment.

FIG. 4 illustrates a schematic configuration illustrating a data communication system using a data communication apparatus according to the present embodiment. This data communication system includes a video camera 21, an encoder 22, a flash memory 23, data communication apparatuses 110, 210, and switching hubs 31 and 32. In this system, the encoder 22 encodes a video taken by the video camera 21. The data communication apparatus 110 transmits the encoded video data to the data communication apparatus 210 via a plurality of (in this case, two) communications paths. The data communication apparatus 210 records the received video data to the flash memory 23. The switching hubs 31, 32 are arranged in the communication paths.

The data communication apparatuses 110, 210 are similar to the data communication apparatus 10 as illustrated in FIG. 1. The data communication apparatus 110 includes a MAC 111 corresponding to the communication unit 11, a MAC 112 corresponding to the communication unit 12, a TOE 113 corresponding to the hardware protocol processing unit 13, and a CPU 114 corresponding to the software protocol processing unit 14. The data communication apparatus 110 also includes constituent elements corresponding to the session information storage unit 15 and the frame information storage unit 16 of the data communication apparatus 10 as illustrated in FIG. 1, but these constituent elements are not illustrated in FIG. 4.

The data communication apparatus 210 includes a MAC 211 corresponding to the communication unit 11, a MAC 212 corresponding to the communication unit 12, a TOE 213 corresponding to the hardware protocol processing unit 13, and a CPU 214 corresponding to the software protocol processing unit 14. The data communication apparatus 210 also includes constituent elements corresponding to the session information storage unit 15 and the frame information storage unit 16 of the data communication apparatus 10 as illustrated in FIG. 1, but these constituent elements are not illustrated in FIG. 4.

The encoder 22 is connected via the TOE 113 and the CPU 114 via a bus. The TOE 113 is connected, by means of Ethernet, to the switching hubs 31, 32 via the MACs 111, 112 each structured with different hardware. The encoder 22 includes input terminals of SD-SDI (Standard Definition Serial Digital Interface) defined by SMPTE-259M and HD-SDI (High Definition Serial Digital Interface) defined by SMPTE-292M. The encoder encodes the SD-SDI signal or the HD-SDI signal output from the video camera 21 with motion picture encoding standards such as MPEG-2 and H.264, and outputs the encoded signal to the TOE 113.

The flash memory 23 is connected to the TOE 213 and the CPU 214 via the bus. The TOE 213 is connected, by means of Ethernet, to the switching hubs 31, 32 via the MACs 211, 212 each structured with different hardware.

The TOE 113 has hardware (serializer) for serializing and processing frames received from the two MACs 111, 112. Likewise, the TOE 213 has hardware for serializing and processing frames received from the two MACs 211, 212.

As illustrated in FIG. 4, an address assigned to a network constituted by the switching hub 31 is 192.168.1.0/24. An address assigned to a network constituted by the switching hub 32 is 192.168.2.0/24. An IP address assigned to the side of the MAC 111 of the TOE 113 is 192.168.1.1. An IP address assigned to the side of the MAC 112 of the TOE 113 is 192.168.2.1. An IP address assigned to the side of the MAC 211 of the TOE 213 is 192.168.1.2. An IP address assigned to the side of the MAC 212 of the TOE 213 is 192.168.2.2.

In this system, TCP is used to transmit the video stream output from the encoder 22 to the flash memory 23. First, a TCP session is established by the side of the encoder 22 in order to transfer the video stream by TCP. In order to establish the session, it is necessary to obtain the MAC (Media Access Control) address of the destination of transmission (TOE 213) in advance.

First, the software operating on the CPU 114 performs transmission processing of an ARP request packet for resolving the IP address of the destination, i.e., 192.168.1.2, to a MAC address in order to obtain the MAC address of the destination of transmission. There are two MACs capable of outputting frames, but it is known that the IP address resolved in this example exists in the network to which the MAC 111 belongs. Therefore, the CPU 114 uses a descriptor to cause the TOE 113 to perform Ethernet transmission processing and instructs the TOE 113 to transmit a frame via the MAC 111. If a network to which the IP address belongs to is not known, the frame may be transmitted from both of the MAC 111 and the MAC 112.

The descriptor is an interface for transmitting information between the TOE 113 (hardware protocol processing unit 13) and the CPU 114 (software protocol processing unit 14). An entry of the descriptor includes fields of DESCRIPTOR_TYPE having a fixed length, NETWORK_ID, BUFFER_ADDRESS, and PROCESS_DONE. The descriptors are arranged in a plurality of arrangements on a shared memory to form a ring buffer. One of the software protocol processing unit 14 and the hardware protocol processing unit 13 can transmit information by notifying an entry number of a descriptor to be processed to the other of the software protocol processing unit 14 and the hardware protocol processing unit 13. An instruction given to the software protocol processing unit 14 from the hardware protocol processing unit 13 operating at a fast speed can be buffered with this descriptor.

DESCRIPTOR_TYPE indicates whether the descriptor is used for a frame transmission instruction given by the CPU to the TOE or for a frame reception instruction given by the TOE to the CPU. If DESCRIPTOR_TYPE indicates that the descriptor is the frame transmission instruction given by the CPU to the TOE, the CPU stores, to NETWORK_ID, an identifier of a MAC to which a frame is transmitted. The CPU stores, to BUFFER_ADDRESS, an address of the shared memory at which the transmission frame is stored. The CPU stores, to PROCESS_DONE, information about a protocol whose process by the CPU has been finished.

On the other hand, if DESCRIPTOR_TYPE indicates that the descriptor is a frame reception instruction given by the TOE to the CPU, the TOE stores, to NETWORK_ID, an identifier of a network from which a frame is received. The TOE stores, to BUFFER_ADDRESS, an address of the shared memory at which the reception frame is stored. The TOE stores, to PROCESS_DONE, information about a protocol whose processing by the TOE has been finished.

If the CPU 113 transmits an ARP request packet, the CPU 114 stores, to DESCRIPTOR_TYPE of the descriptor, a value indicating a transmission instruction. The CPU 114 stores, to NETWORK_ID, information indicating the network to which the MAC 112 belongs. The CPU 114 stores, to BUFFER_ADDRESS, an address of the shared memory at which the transmission frame is stored. The CPU 114 stores, to PROCESS_DONE, information indicating that the processing of ARP is completed.

As described above, the ARP request packet transmitted from the MAC 111 is received by the MAC 211 via the switching hub 31. The TOE 213 performs Ethernet reception processing on the frame received by the MAC 211, and uses the descriptor to transmit information about the reception frame to the CPU 214 in order to process the ARP, i.e., higher-level protocol. In this case, DESCRIPTOR_TYPE has a value indicating a reception instruction. NETWORK_ID has a value indicating the network to which the MAC 211 belongs. BUFFER_ADDRESS has an address of the shared memory at which the reception frame is stored. PROCESS_DONE has information indicating that the Ethernet processing is completed.

The software operating on the CPU 214 performs ARP reception processing of the reception frame obtained from the descriptor, and generates an ARP response packet by performing ARP transmission processing in order to reply to this ARP request. Then, the CPU 214 uses the descriptor to instruct the TOE 213 to perform the Ethernet processing and thereafter transmit the ARP response packet via the network from which the frame has been received.

At this point, DESCRIPTOR_TYPE has a value indicating a transmission instruction. NETWORK_ID has an identifier indicating the MAC 211, i.e., a network interface from which the ARP request packet is received. BUFFER_ADDRESS has an address of the shared memory at which the ARP response packet generated by the CPU 214 is stored. PROCESS_DONE has information indicating that ARP processing is completed. Therefore, the TOE 213 performs the Ethernet transmission processing, and the ARP response packet is transmitted via the MAC 211.

When the TOE 113 receives the frame (ARP response packet) via the switching hub 31 and the MAC 111, the TOE 113 performs Ethernet reception processing, and uses the descriptor to instruct the CPU 114 to perform reception processing. The CPU 114 processes this ARP response packet, and obtains the MAC address corresponding to the IP address assigned to the side of the MAC 211 of the TOE 213 connected to the flash memory 23.

As described above, for each frame, the CPUs 114, 214 and the TOEs 113, 213 notify each other of a network from which a frame is received or a network to which a frame is transmitted, whereby communication can be performed using only one TOE connected to the plurality of MACs.

The software operating on the CPU 114 uses the MAC address thus obtained to transmit a TCP session establishing request segment including a SYN flag via the TOE 113 and the MAC 111 in order to establish a session between 192.168.1.1 and 192.168.1.2. The TCP session establishment segment having reached the MAC 211 via the switching hub 31 is subjected to frame reception processing performed by the MAC 211, and is subjected to Ethernet reception processing, IPv4 reception processing, and TCP data reception processing performed by the TOE 213.

Then, the TOE 213 uses the descriptor to notify information about the reception frame to the CPU 214. The CPU 214 performs TCP header analysis processing of the segment including the SYN flag of TCP. If the CPU 214 can accept the segment including the SYN flag, the CPU 214 generates a segment including a SYN flag and an ACK flag, and uses the descriptor to transmit information about the transmission frame to the TOE 213. The TOE 213 performs TCP data processing, IPv4 processing, and Ethernet processing, and transmits the frame via the MAC 211.

The segment including the SYN flag and the ACK flag is received by the MAC 111 via the switching hub 31, and is subjected to the frame reception processing. The TOE 113 performs Ethernet reception processing, IPv4 reception processing, and TCP reception data processing on the reception frame. Then, the TOE 113 uses the descriptor to notify the information about the reception frame to the CPU 114. The CPU 114 performs TCP header analysis/reception processing of the segment including the SYN flag and the ACK flag. When this segment is acceptable, and the session is established, the CPU 114 causes the session information storage unit 15 (not illustrated in FIG. 4) in the data communication apparatus 110 to store NETWORK_ID set in the descriptor as a network to which the session belongs to.

Further, the CPU 114 generates a TCP segment including an ACK flag, and transmits a frame via the TOE 113 and the MAC 111. This frame is received by the TOE 213 via the switching hub 31 and the MAC 211, and the TOE 213 uses the descriptor to transmit information about the frame to the CPU 214. When the CPU 214 performs session establishing processing, the CPU 214 causes the session information storage unit 15 (not illustrated in FIG. 4) in the data communication apparatus 210 to store NETWORK_ID set in the descriptor as a network to which the session belongs.

Likewise, the software operating on the CPU 114 uses ARP to resolve 192.168.2.2 to a corresponding MAC address, and establishes a TCP session between 192.168.2.1 and 192.168.2.2.

Alternatively, instead of initiating a TCP session establishing process by the encoder 22, a TCP session establishing process may be initiated by the flash memory 23 according to the above method.

As described above, when two sessions are established between the encoder 22 and the flash memory 23, the encoder 22 encodes input data provided by the video camera 21. The TOE 113 uses the two sessions to transmit output data of the encoder 22 via TCP. In the two sessions, the same data are transmitted.

The TOE 113 divides read data into segments having a size equal to or less than an MSS (Maximum Segment Size) derived from a MTU (Maximum Transfer Unit), and performs TCP transmission processing, IPv4 transmission processing, and Ethernet transmission processing. It should be noted that it may be possible to use a value of MSS exchanged as a TCP option during three way handshake, or the MSS may be obtained by Path MTU Discovery.

In order to perform transmission processing, it is necessary to determine a network used to transmit a TCP segment. The TCP segment is output from a MAC to which a session belongs. The MAC to which the session belongs is stored in the session information storage unit 15.

Figure 5:
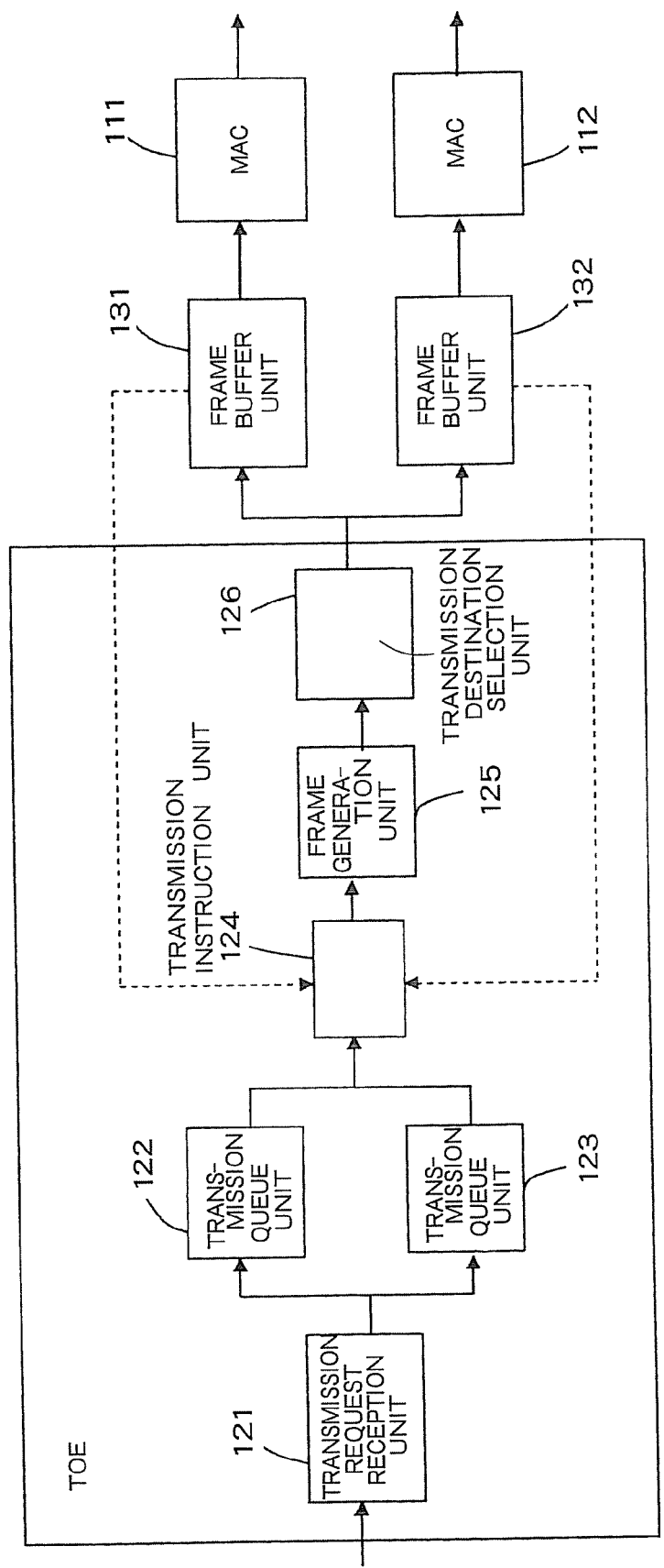
FIG. 5 is a block diagram illustrating an example of a configuration of a TOE.

As described above, the TOE 113 reads data from the encoder 22 not in units of frames but in units of data transmissions which are larger than the frames, and transmits the data using the identifier of the MAC to which the session belongs, which is obtained from the session information. Therefore, the CPU 114 does not need to specify an output network for each frame, and the transmission speed can be increased. In addition, the processing load of the CPU can be reduced. FIG. 5 illustrates an example of a configuration of the TOE 113. The TOE 113 includes a transmission request reception unit 121, transmission queue units 122, 123, a transmission instruction unit 124, a frame generation unit 125, and a transmission destination selection unit 126.

The transmission request reception unit 121 receives a data transmission request from the CPU 114 and the flash memory 23. The plurality of transmission queue units 122, 123 are arranged to correspond to the interfaces of the communication units 111, 112, and place data transmission requests transmitted from the corresponding communication units into queues.

The transmission instruction unit 124 retrieves transmission requests placed in the queues of the transmission queue units 122, 123, and outputs transmission instructions based on the requests. The frame generation unit 125 generates transmission frames based on the transmission instructions. The transmission destination selection unit 126 stores the generated transmission frames to frame buffer units 131, 132, which are arranged to correspond to the destination communication units. The frame buffer units 131, 132 are arranged in a stage prior to the communication units 111, 112 to buffer frames output from the transmission destination selection unit 126.

The transmission instruction unit 124 determines whether the remaining buffer capacities of the frame buffer units 131, 132 are more than a predetermined size. When one of them is determined to be more than the predetermined size but the other of them is determined not to be more than the predetermined size, the transmission instruction unit 124 preferentially retrieves a transmission request from one of the transmission queue units 122, 123 corresponding to a buffer whose remaining buffer capacity is determined to be more than the predetermined size.

Herein, the predetermined size is a capacity large enough to store, without any delay, frames generated according to transmission requests currently processed by the transmission instruction unit 124. If there is a buffer between the transmission instruction unit 124 and the frame generation unit 125 or between the frame generation unit 125 and the transmission destination selection unit 126, it is necessary to store frames held in the buffers first. Therefore, the remaining buffer capacity of the frame buffer unit needs to be at least a summation of the sizes of these buffers.

In particular, if a checksum of the entire data is calculated and stored to a header of a segment such as a TCP segment, it is necessary to transmit the calculation result first before transmitting the data. Therefore, a buffer for temporarily storing the entire frame is needed in the transmission processing. In this case, not only the size of a frame generated according to a transmission request currently processed by the transmission instruction unit 124 but also the size of a frame stored in a buffer for a checksum calculation are necessary.

If transmission requests are not preferentially selected as described above, namely, if a frame is given to one of the frame buffer units 131, 132 that has a small remaining buffer capacity, at least the transmission destination selection unit 126 keeps on waiting until the capacity of the one of the frame buffer units 131, 132 becomes available, during which time the other of the MACs 111, 112 cannot perform transmission. This means that when there is a failure in one of the paths, the other is unable to perform transmission either. Therefore, there is no advantage of communication with the plurality of communication units. However, this kind of problem can be solved by causing the TOE 113 to have a structure as illustrated in FIG. 5.

As described above, TCP data segments transmitted from the MACs 111, 112 are received by the MACs 211, 212 by way of the switching hubs 32, 31, respectively. Then, the TCP data segments are subjected to the reception processing performed by the TOE 213, and are written to different storage regions of the flash memory 23 for each session. When all the data transfer is finished, the data communication apparatuses 110, 210 transmit segments including FIN flags, and perform TCP session termination processing. When the termination of the session is accepted, the session information in the session information storage unit 15 is discarded.

If no failure occurs in the communication paths after the session termination processing, and the streams of both of the sessions are successfully written to the flash memory 23 without any loss, one of the streams is discarded. On the other hand, if there is a malfunction in an apparatus constituting a communication path, the stream transmitted by the communication path including the malfunctioning apparatus is discarded, and the normally received stream is preserved.

When a failure occurs in a communication path, the TOE 113 cannot perform transmission, which causes a buffer in the encoder 22 to overflow. Therefore, one of the files of the streams written to the flash memory 23 that has a larger file size may be determined to be a normally received stream.

As described above, according to the data communication apparatus according to the present embodiment, one TOE (hardware offload engine) can perform communication via a plurality of communication paths. Therefore, even when there is a malfunction in an apparatus in a communication path, a video stream can be transmitted at a fast speed without any loss. Moreover, it is not necessary to arrange as many TOEs as the number of communication paths, and the cost can be reduced. Therefore, the speed and the reliability of data communication can be improved at a low cost.

Figure 6:
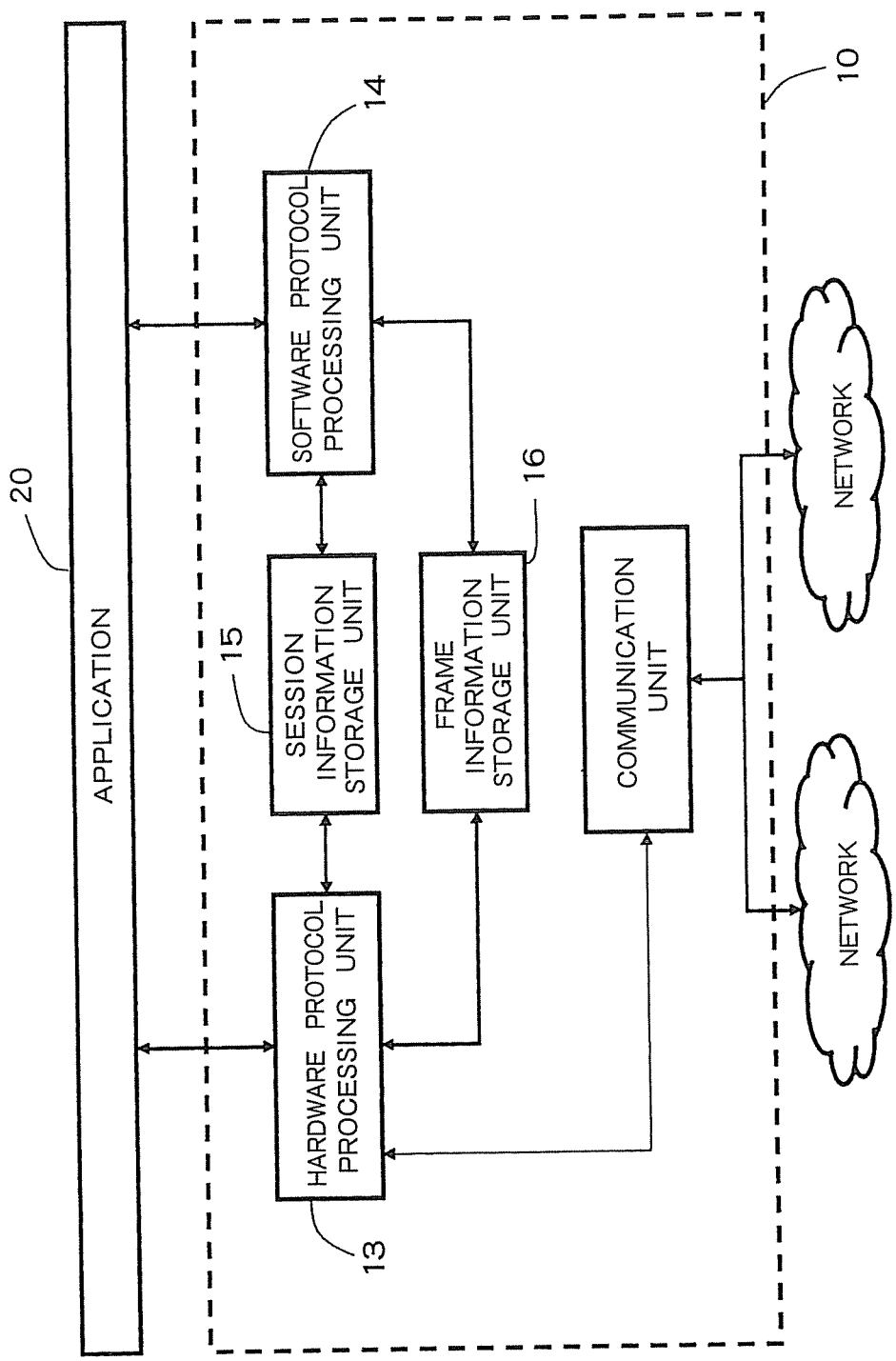
FIG. 6 is a schematic configuration diagram illustrating a data communication apparatus according to a modification.

According to the first embodiment, the communication units of the data communication apparatus 10 are constituted by a plurality of pieces of hardware. Namely, in the above explanation, the data communication apparatus 10 is configured to include the two communication units 11, 12. Alternatively, as long as a summation of the communication speeds of the two networks is below a level that can be processed by one communication unit, the data communication apparatus 10 may have only one communication unit as illustrated in FIG. 6 and may have hardware for branching a plurality of interfaces such as MIT (Media Independent Interface), GMII (Gigabit Media Independent Interface), and XGMII (10 Gigabit Media Independent Interface). In this case, the process for serializing received frames may be carried out not by the hardware protocol processing unit 13 but by the communication unit.

In the first embodiment, the TOE 213 can transmit data read out from the flash memory 23.

(Second Embodiment)

Figure 7:
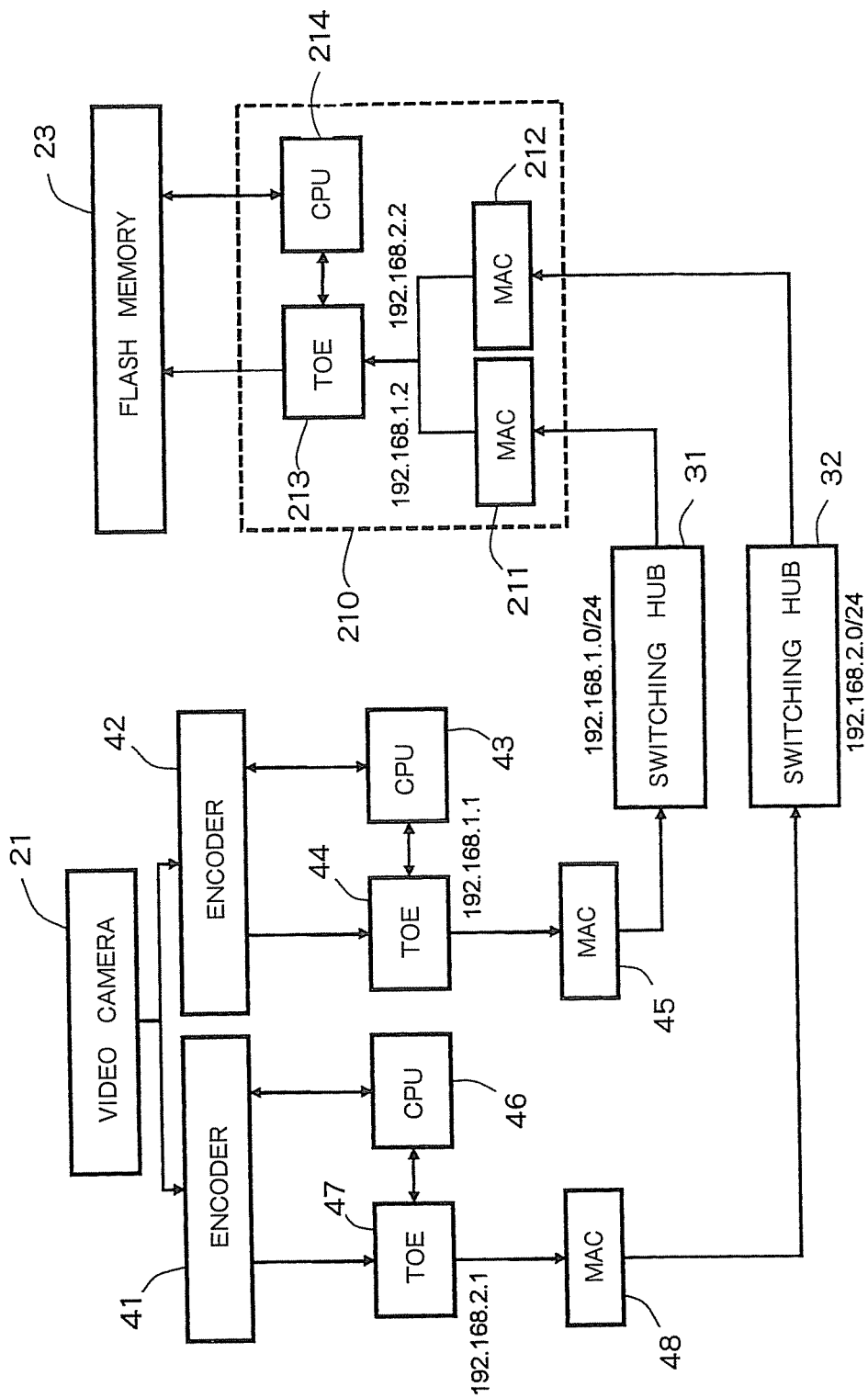
FIG. 7 is a schematic configuration diagram illustrating a data communication system according to the second embodiment of the present invention.

FIG. 7 illustrates a schematic configuration of a data communication system according to the second embodiment of the present invention. In this system, video data taken by a video camera 21 is transmitted via a plurality of communication paths, and the video data received by a data communication apparatus 210 are stored to a flash memory 23. The data communication apparatus 210 has the same configuration as the data communication apparatus 10 according to the first embodiment as illustrated in FIG. 1 and the data communication apparatus 210 as illustrated in FIG. 4. In FIG. 7, the same portions as those of the first embodiment as illustrated in FIG. 4 are denoted with the same reference numerals, and the description thereabout is omitted.

Encoders 41, 42 encode an SD-SDI signal or an HD-SDI signal received from the video camera 21 with motion picture encoding standards such as MPEG-2 and H.264. The encoder 41 is connected to a CPU 43 and a TOE 44, and is connected to a switching hub 31 via a MAC 45 by means of Ethernet. Likewise, the encoder 42 is also connected to a CPU 46 and a TOE 47, and is connected to a switching hub 32 via a MAC 48 by means of Ethernet. The TOEs 44, 47 are different from the first embodiment in that each of the TOEs 44, 47 performs communication via only one communication path.

An address assigned to a network constituted by the switching hub 31 is 192.168.1.0/24. An address assigned to a network constituted by the switching hub 32 is 192.168.2.0/24. An IP address assigned to the TOE 44 is 192.168.1.1. An IP address assigned to the TOE 47 is 192.168.2.1. An IP address assigned to a side of a MAC 211 of a TOE 213 is 192.168.1.2. An IP address assigned to a side of a MAC 212 of the TOE 213 is 192.168.2.2.

Two video streams taken by the video camera 21 are encoded by the encoders 41, 42, and transmitted via switching hubs 31, 32, respectively. Then, the two video streams are written to the flash memory 23. Although the input signal provided by the video camera 21 is the same, encoded results provided by the encoders 41, 42 may be different even with the same encoder. Therefore, the streams are transmitted via different TCP connections.

First, in order to perform transmission by TCP, the encoder 41 and the encoder 42 resolve 192.168.1.2 and 192.168.2.2 into MAC addresses by means of ARP, and establish TCP sessions. Like the first embodiment, this is carried out according to a method using a descriptor and session information.

After a TCP session is established between the encoder 41 and the flash memory 23, and a TCP session is established between the encoder 42 and the flash memory 23, the encoder 41 and the encoder 42 start outputting data to transmit the data by TCP.

The TOE 44 of the encoder 41 performs TCP transmission processing, IPv4 transmission processing, and Ethernet transmission processing. A TCP data segment transmitted from the MAC 45 is received by the MAC 211 via the switching hub 31. The MAC 211 performs reception processing of frames. The TOE 213 performs Ethernet reception processing, IPv4 reception processing, and TCP reception processing. Then, the data are written to the flash memory 23.

The TOE 47 of the encoder 42 performs TCP transmission processing, IPv4 transmission processing, and Ethernet transmission processing. A TCP data segment transmitted from the MAC 48 is received by the MAC 212 via the switching hub 32. The MAC 212 performs reception processing of frames. The TOE 213 performs Ethernet reception processing, IPv4 reception processing, and TCP reception processing. Then, the data are written to the flash memory 23.

When all the data transfer is finished, the encoders 41, 42, and the flash memory 23 transmit segments including FIN flags, and performs TCP session termination processing. When the termination of the session is accepted, the session information in the session information storage unit 15 is discarded.

If no failure occurs in the communication paths after the session termination processing, and the streams of both of the sessions are successfully written to the flash memory 23 without any loss, one of the streams is discarded. On the other hand, if there is a malfunction in an apparatus constituting a communication path, the stream transmitted by the communication path including the malfunctioning apparatus is discarded, and the normally received stream is preserved.

Further, based on timestamps of motion pictures, different sessions may complement each other for lost portions to recover a stream. When the same stream is transmitted via different sessions, a position with respect to the head of each stream may be calculated, and the streams may complement lost portions.

As described above, according to the present embodiment, the two encoders 41, 42 are used to achieve redundancy. Even when there is a malfunction in an encoder or an apparatus in a communication path, a video stream can be transmitted at a fast speed while the possibility of data loss is further reduced. Therefore, the speed and the reliability of data communication can be further improved.

(Third Embodiment)

Figure 8:
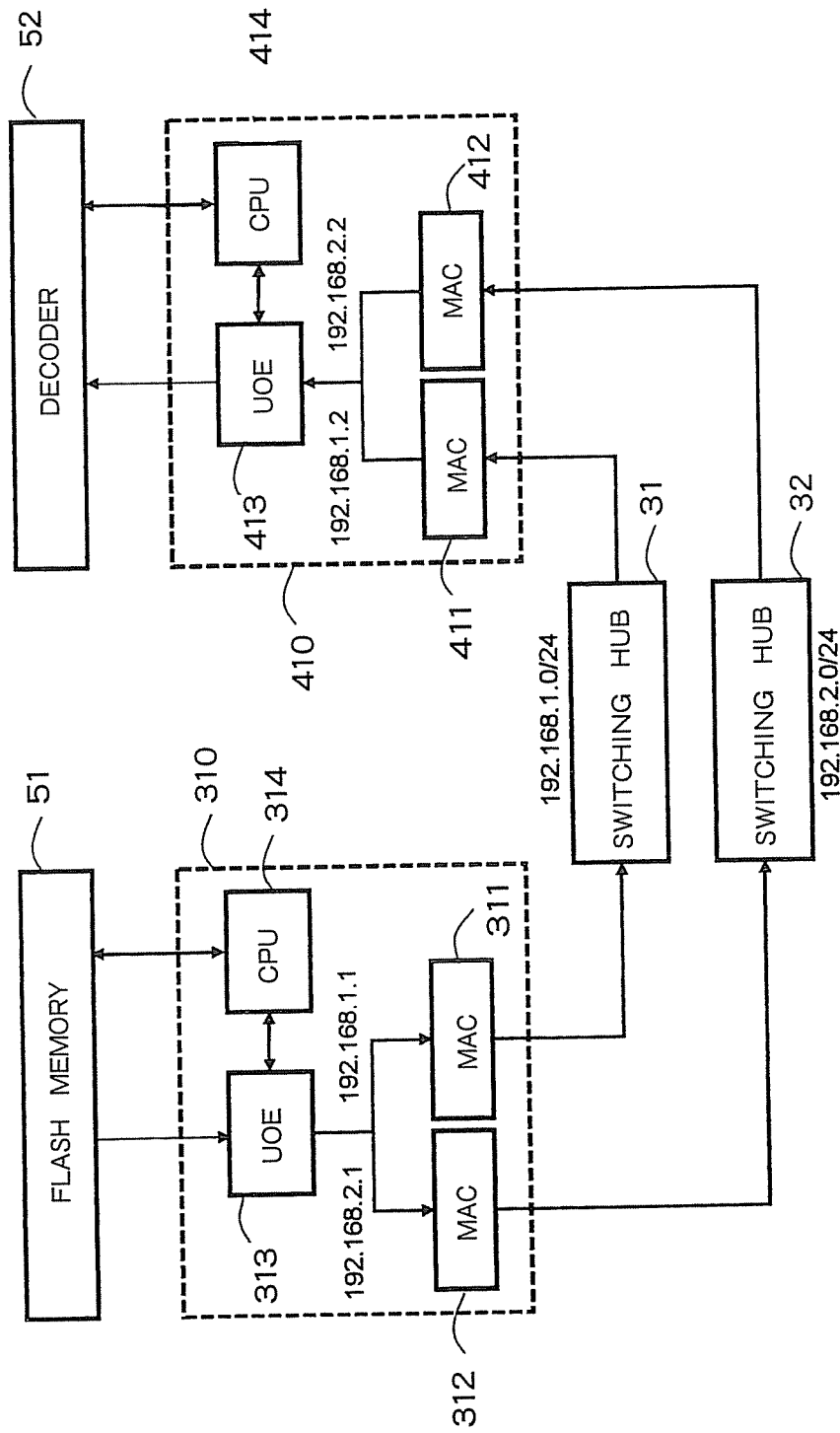
FIG. 8 is a schematic configuration diagram illustrating a data communication system according to the third embodiment of the present invention.

FIG. 8 illustrates a schematic configuration of a data communication system according to the third embodiment of the present invention. In this system, a data communication apparatus 310 retrieves and transmits a video stream, which is encoded with motion picture encoding standards such as MPEG-2 and H.264 and is stored in the flash memory 51, and a data communication apparatus 410 receives the video stream and causes a decoder 52 to decode and output the video stream.

The data communication apparatuses 310, 410 correspond to the data communication apparatus 10 as illustrated in FIG. 1. When the data communication apparatuses 310, 410 and the data communication apparatus 10 are compared, it is understood that MACs 311, 312, 411, 412 have the same configurations as the communication units 11, 12. Frame information storage units (not illustrated) arranged in the data communication apparatuses 310, 410 have the same configurations as the frame information storage unit 16 as illustrated in FIG. 1. On the other hand, constituent elements in the data communication apparatuses 310, 410 corresponding to the hardware protocol processing unit 13, the software protocol processing unit 14, and the session information storage unit 15 of the data communication apparatus 10 as illustrated in FIG. 1 have different configurations and operate differently.

In the present embodiment, the hardware protocol processing unit 13 is achieved with UOEs (UDP/IP Offload Engines) 313, 413, and includes Ethernet processing function, IPv4 processing function except for routing function, UDP data processing function, and processing function of user-defined protocols stored in payload of UDP.

The Ethernet processing function and the IPv4 processing function are the same as those of the first embodiment. The UDP data processing function includes UDP data reception processing and UDP data transmission processing. The UDP data reception processing includes analysis of destination port number, source port number, and packet length of a UDP header, and UDP checksum calculation. The UDP data transmission processing includes setting of destination port number, source port number, and packet length of a UDP header, and UDP checksum calculation.

The user-defined protocol processing includes user-defined protocol reception processing and user-defined protocol transmission processing. In the user-defined protocol reception processing, a sequence number of a user-defined protocol defined by a format, explained later, and data having a correct checksum are transmitted in association with the sequence numbers to an application. In the user-defined protocol transmission processing, data specified by an application is divided if necessary, and a sequence number is attached to each of the divided data.

The software protocol processing unit 14 (CPUs 314, 414) is achieved with software operating on the CPUs, and includes ARP processing function, routing processing function, and UDP session management processing function. The UDP session management processing function is a function for generating session information when a port is opened by an application, and discarding the session information when the port is closed by the application. When the software protocol processing unit 14 opens a port and generates session information, the software protocol processing unit 14 sets an identifier indicating a MAC to which a session in question belongs to based on a destination IP address. The session information storage unit 15 (not illustrated in FIG. 8) stores UDP session information, and provides a sharing function for allowing the UDP session information to be shared by the hardware protocol processing unit 13 and the software protocol processing unit 14. Herein, the UDP session information includes an IP address and a port number of a source apparatus, an IP address and a port number of a destination apparatus, and an identifier indicating an interface of a MAC to which a session in question belongs.

In the reception processing performed by the data communication apparatus according to the present embodiment, first, the communication units 11, 12 perform reception processing to receive frames from a network. Subsequently, the hardware protocol processing unit 13 performs Ethernet reception processing, IPv4 reception processing, and UDP data reception processing of the received frames. If the reception frame is a UDP datagram, and the session has already been established, the hardware protocol processing unit 13 transfers data to an application.

On the other hand, if the session is not a UDP datagram in an established session, the hardware protocol processing unit 13 notifies the software protocol processing unit of an identifier indicating an interface of a communication unit from which a reception frame in question is received, and the software protocol processing unit 14 processes the reception frame.

In the transmission processing performed by the data communication apparatus according to the present embodiment, a determination is made as to whether data to be transmitted is data in an established session. In a case where the data to be transmitted is data in an established session, the identifier of the interface of the communication unit to which the session in question belongs is obtained from the session information storage unit, and the hardware protocol processing unit 13 performs user-defined protocol transmission processing, UDP data transmission processing, IPv4 transmission processing, and Ethernet transmission processing. Then, the communication unit outputs frames to a destination apparatus.

On the other hand, if transmission data is not UDP data in an established session but is an ARP packet, the software protocol processing unit 14 performs ARP transmission protocol processing. The software protocol processing unit 14 includes routing processing function. Therefore, the software protocol processing unit 14 determines a network segment to which the transmission data is to be transmitted based on the destination IP address, i.e., an interface of a communication unit to which the transmission data is to be transmitted, and notifies the hardware protocol processing unit 13 of an identifier indicating the interface of the corresponding communication unit. Subsequently, the hardware protocol processing unit 13 performs transmission frame protocol processing, and causes the network unit to transmit frames to the network.

In the data communication system according to the present embodiment, the flash memory 51 is connected to the UOE 313 and the CPU 314 via a bus, and the UOE 313 is connected to the two MACs 311, 312 via a bus. The MACs 311, 312 are respectively connected to the switching hubs 31, 32 by means of Ethernet.

The decoder 52 is connected to the UOE 413 and the CPU 414 via a bus. The UOE 413 is connected to the two MACs 411, 412 via a bus. The MACs 411, 412 are connected to switching hubs 31, 32, respectively, by means of Ethernet.

An address assigned to a network constituted by the switching hub 31 is 192.168.1.0/24. An address assigned to a network constituted by the switching hub 32 is 192.168.2.0/24. An IP address assigned to a MAC 311 of a UOE 313 is 192.168.1.1. An IP address assigned to a MAC 312 of the UOE 313 is 192.168.2.1. An IP address assigned to a MAC 411 of a UOE 413 192.168.1.2. An IP address assigned to a MAC 412 of the UOE 413 is 192.168.2.2.

In this system, totally two sessions, i.e., one session between 192.168.1.1 and 192.168.1.2 and the other session between 192.168.2.1 and 192.168.2.2, are established between the UOE 313 and the UOE 413, and UDP datagrams are transmitted from the UOE 313 to the UOE 413. In this system, a determination of a session to which the same data are transmitted is made based on whether the UDP port number of the UOE 413 is the same or not.

In order to receive a UDP datagram before the UOE 313 starts transmission of a UDP datagram, the CPU 414 opens a port, generates session information, and establishes a session. On the other hand, the UOE 313 needs to resolve the IP addresses 192.168.1.2 and 192.168.2.2 of the UOE 413 to MAC addresses. The UOE 313 uses ARP to resolve the IP addresses in the same manner as the first embodiment. Subsequently, the CPU 314 opens a port, and generates session information. At this occasion, the routing function of the CPU 314 is used to specify a network to which the session in question belongs, which is included in the session information.

When the UOE 313 and the UOE 413 establish sessions, the two sessions are used to start transmission. The UOE 313 performs fast UDP processing of the video stream read out from the flash memory 51, whereby the video stream is transmitted to the UOE 413 via two communication paths, i.e., a communication path by way of the MAC 311, the switching hub 31, and the MAC 411 (192.168.1.1 and 192.168.1.2) and a communication path by way of the MAC 312, the switching hub 32, and the MAC 412 (192.168.2.1 and 192.168.2.2).

The format of a frame transmitted from the UOE 313 to the UOE 413 has a structure including Ethernet header, IPv4 header, UDP header, sequence number, and data. The sequence number has a fixed length of 32 bits, and subsequent data are video data in this structure.

The UOE 313 divides data from the flash memory 51 into pieces each having a size not more than an MTU instructed by the CPU 314 and the like via the session information storage unit and the like, and attaches a sequence number to each of them. Then, the UOE 313 performs UDP data transmission processing, IPv4 transmission processing, and Ethernet transmission processing on payloads including the sequence numbers thus attached and the divided data, and outputs the payloads to a MAC to which the session in question belongs, which is read from the session information storage unit.

The destination IP address and the destination MAC address, which are set at this moment, are read from the session information storage unit. The IP address and the MAC address of the MAC 411 are attached to frames transmitted from the MAC 311. The IP address and the MAC address of the MAC 412 are attached to frames transmitted from the MAC 312.

By doing so, the CPU 314 does not need to specify a destination MAC for each frame transmission, and can perform the transmission processing upon reading, from the session information storage unit, the identifiers of the MACs to which the UOE 313 transmits the frames.

The UOE 313 and the UOE 413 distinguish sessions based on destination port numbers of UDP datagrams. More specifically, if a UDP datagram has the same destination port number, the UDP datagram is determined to be in the same session. Therefore, the same port number is specified as the destination port numbers of the UDP headers of the two sessions. It should be noted that the UOE 313 needs to read data from the flash memory 51 with a regular interval and transmit the data so as to avoid overflow of the buffer of the decoder 52.

FIG. 9 is an example of a configuration of the UOE 313. The UOE 313 includes a transmission request reception unit 321 for receiving a data transmission request, a transmission queue unit 322 for placing the received data transmission request into a queue, a frame generation unit 324 for generating a transmission frame based on the transmission request placed in the queue, and a frame transmission unit 325 for giving the transmission to each communication unit. When the frame generation unit 324 generates a new transmission frame based on a transmission request newly placed in the queue of the transmission queue unit 322 while the frame transmission unit 325 gives a frame to only one of the plurality of MACs (communication units) 311, 312 that can receive a transmission frame, the transmission instruction unit 323 instructs the frame transmission unit 325 to discard the transmission frame. The frame transmission unit 325 discards the transmission frame, and starts transmission of a new frame generated by the frame generation unit 324.

In contrast, in a conventional data communication apparatus to which the data communication apparatus according to the present embodiment is not applied, once a frame generation unit copies and generates each frame, and starts giving the frames to the communication unit, the frame generation unit has to continue this process until the transmission of these frames is completed. In this configuration, if a frame transmission unit continuously fails to give frames to one or a plurality of communication units, the frame generation unit has to stop generation of a subsequent frame. As a result, transmission of subsequent frames is delayed.

In contrast, in the data communication apparatus according to the present embodiment, when the frame generation unit 324 finishes generation of a frame subsequently transmitted, the transmission instruction unit 323 causes the frame transmission unit 325 to stop transfer of a frame to the communication units 311, 312 and start transfer of a subsequently transmitted frame.

Alternatively, the transmission instruction unit 323 may monitor a transfer time of each frame of the frame transmission unit 325. When the transfer time is determined to be more than a transmission limit time, the transmission instruction unit 323 may cause the frame transmission unit 325 to stop transfer of a frame and start transfer of a subsequently transmitted frame.

With the above data communication apparatus thus configured, even when the frame transmission unit 325 is unable to give a frame to one or a plurality of communication units, e.g., a pause frame is transmitted from a switching hub due to congestion of a communication path, or a link of a MAC breaks down due to malfunction of a switching hub or a break in a cable, the frame transmission unit 325 can discard the frame and can give a subsequently transmitted frame. Therefore, the frame transmission unit 325 can keep on giving frames without delay.

On the other hand, since the UOE 413 performs reception processing and manages data received in two sessions, the UOE 413 stores a reception state bitmap to a shared memory, which can be referred to by session information. In the reception state bitmap, for each received sequence number, a value "1" is set if a reception is completed, and a value "0" is set if a reception is incomplete. All the sequence numbers in the bitmap are initialized with the value "0" meaning incomplete normal reception.

Frames transmitted from the UOE 313 via the MACs 311, 312 are transmitted to the MACs 411, 412 via the switching hubs 31, 32, and are subjected to frame reception processing. The frames received by the two MACs 411, 412 are serialized by the UOE 413, and are subjected to protocol processing.

Figure 10:
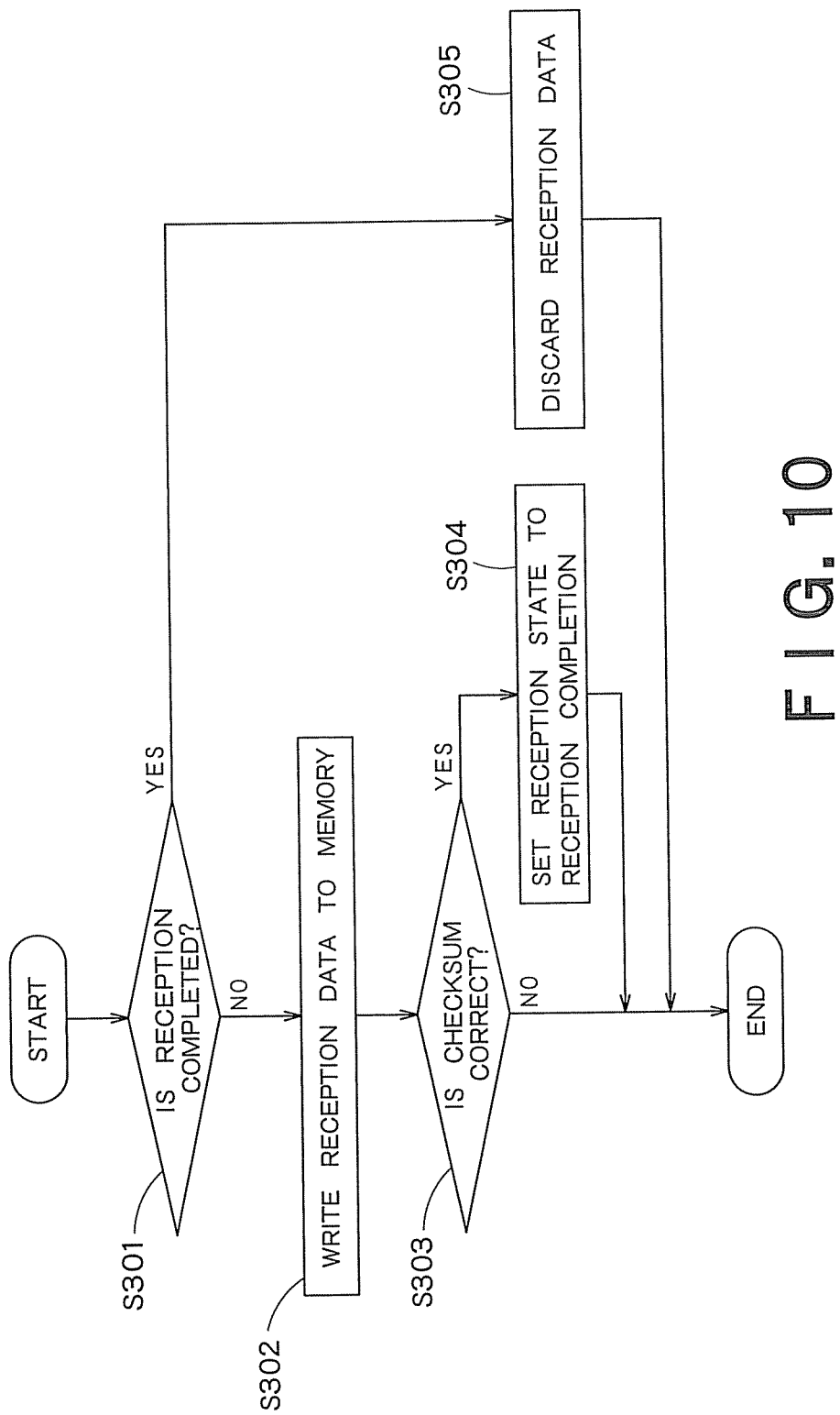
FIG. 10 is a flowchart illustrating reception processing performed by the UOE.

The reception processing performed by the UOE 413 will be explained with reference to a flowchart as illustrated in FIG. 10.

(Step S301) IPv4 reception processing and UDP data reception processing except for checksum calculation are performed to obtain a sequence number and data of user-defined protocol from UDP payload datagram. The reception state bitmap corresponding to the obtained sequence number is read out. When the value is "1" indicating that the reception is completed, step S305 is subsequently performed. On the other hand, when the read value is "0" indicating that the reception is incomplete, step S302 is subsequently performed.

(Step S302) The UOE 413 writes the received data to a memory (not illustrated).

(Step S303) The UOE 413 calculates a checksum of UDP. When the checksum is correct, step S304 is subsequently performed. When the checksum is incorrect, the data reception state corresponding to the sequence number is not changed and is kept "0" indicating that the reception is incomplete.

(Step S304) The UOE 413 sets the reception state bitmap corresponding to the sequence number of the reception data to "1" indicating that the reception is completed.

(Step S305) The UOE 413 discards the received datagram. Therefore, even when a packet loss or malfunction occurs in one of the communication paths, data can be received normally if a datagram having a correct checksum can be received from the other of the communication paths.

As described above, according to the data communication apparatus according to the present embodiment, data can be transmitted fast using a plurality of communication paths using one UOE (hardware offload engine). The same data read out from the flash memory 51 is transmitted via two sessions by means of UDP. Accordingly, even when failure or loss occurs in a communication path, data can be received if a UDP diagram having a correct checksum is received from at least one of the two interfaces.

Moreover, it is not necessary to arrange as many UOEs as the number of communication paths, and the cost can be reduced. Therefore, the speed and the reliability of data communication can be improved at a low cost.

In order to compensate a loss such as a packet loss, a stream may be transmitted upon attaching an error-correcting code such as LDPC (Low Density Parity Check) code, reed solomon code, and a turbo code to the stream read out from the flash memory 51. Then, the error-correcting processing may be performed at a stage prior to output of the stream to the decoder 52.

In the example, the two MACs are connected to the UOE. However, three or more MACs may be arranged to improve the reliability. Alternatively, communication may be performed with three or more sessions.

In the present embodiment, the destination port number of a UDP datagram is used to determine whether the UDP datagram is in the same session or not. Alternatively, a determination may be made based on the source port number, the source IP address, the destination IP address, and the like. Still alternatively, a session identifier may be arranged in a UDP payload.

In the present embodiment, the IP address of the destination apparatus is resolved to a MAC address by means of ARP. Alternatively, a fixed MAC address may be assigned in advance, and communication can be performed using this value.

(Fourth Embodiment)

FIG. 11 illustrates a schematic configuration of a data communication apparatus 60 according to the fourth embodiment of the present invention. The data communication apparatus 60 includes communication units 61, 62, hardware protocol processing units 63, 64, a software protocol processing unit 65, a session information storage unit 66, and a frame information storage unit 67.

The communication units 61, 62 and the software protocol processing unit 65 are the same as the communication units 11, 12 and the software protocol processing unit 14 of the first embodiment as illustrated in FIG. 1.

The hardware protocol processing units 63, 64 are achieved with a TOE (TCP/IP Offload Engine) 10, and include Ethernet processing function, IPv4 processing function except for routing function, and TCP data processing function. When the hardware protocol processing units 63, 64 receive a unicast packet with a non-defined destination MAC address and a non-defined destination IP address, the hardware protocol processing units 63, 64 discard the packet.

The session information storage unit 66 stores TCP session information, so as to allow the TCP session information be shared by the hardware protocol processing units 63, 64 and the software protocol processing unit 65. Herein, the TCP session information is connection information distinguished by an IP address and a port number of a source apparatus and an IP address and a port number of a destination apparatus. Herein, the TCP session information includes sequence number, window size, MAC address, identification information indicating a network to which a session in question belongs to, and the like, which are needed by the hardware protocol processing units 63, 64 and the software protocol processing unit 65 to perform TCP processing in cooperation with each other.

The frame information storage unit 67 stores information about reception frames and transmission frames.

The session information storage unit 66 and the frame information storage unit 67 are achieved with a shared memory connected to a TOE and a CPU via a bus.

Figure 12:
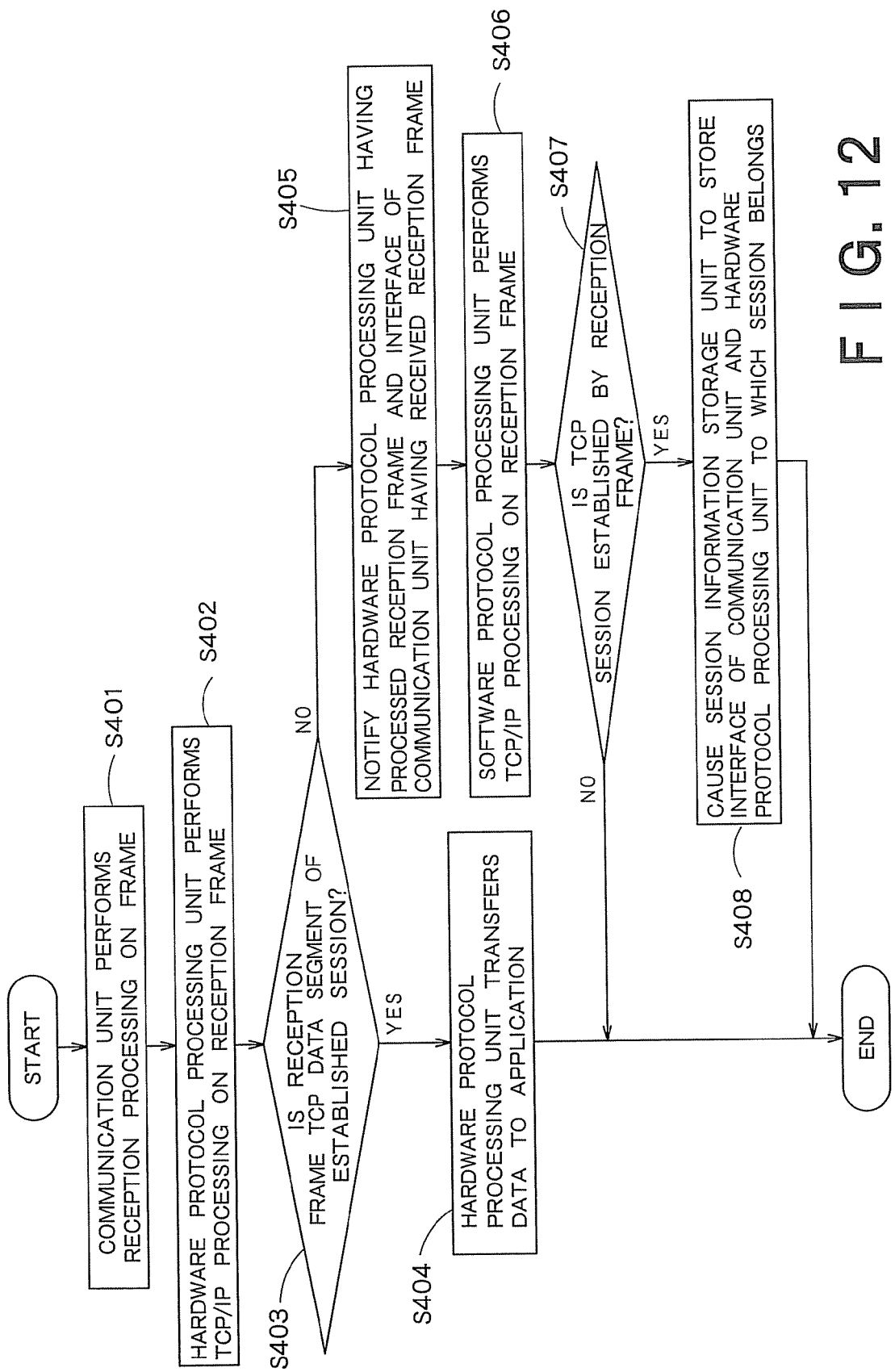
FIG. 12 is a flowchart illustrating reception processing performed by the data communication apparatus according to the fourth embodiment.

Subsequently, the reception processing performed by the data communication apparatus 60 will be explained with reference to a flowchart as illustrated in FIG. 12.

(Step S401) The communication units 61, 62 perform reception processing to receive a frame from a network.

(Step S402) The hardware protocol processing units 63, 64 perform Ethernet reception processing, IPv4 reception processing, and TCP reception data processing of the reception frame.

(Step S403) If it is determined that the reception frame is a TCP data segment in an already established session, step S404 is performed. If not, step S405 is subsequently performed.

(Step S404) The hardware protocol processing units 63, 64 transmit data to an application 70.

(Step S405) The hardware protocol processing units 63, 64 notify an identifier, indicating a hardware protocol processing unit having processed the reception frame and an interface of a communication unit having received the frame, to the software protocol processing unit 65 via a frame information storage unit.

(Step S406) The software protocol processing unit 65 processes the reception frame.

(Step S407) If the reception frame processed by the software protocol processing unit 65 is a response segment in reply to a TCP segment including a SYN flag transmitted by the data communication apparatus 60 itself, and a session is established as a result of the processing, step S408 is subsequently performed. If the reception segment is a TCP segment other than the response segment, an ARP packet, and the like, and a session is not established, the processing is finished.

(Step S408) The session information storage unit 66 stores identification information indicating a network to which the session in question belongs to, i.e., identification information indicating an interface of hardware protocol processing unit that performs the protocol processing and a communication unit that performs transmission and reception.

Figure 13:
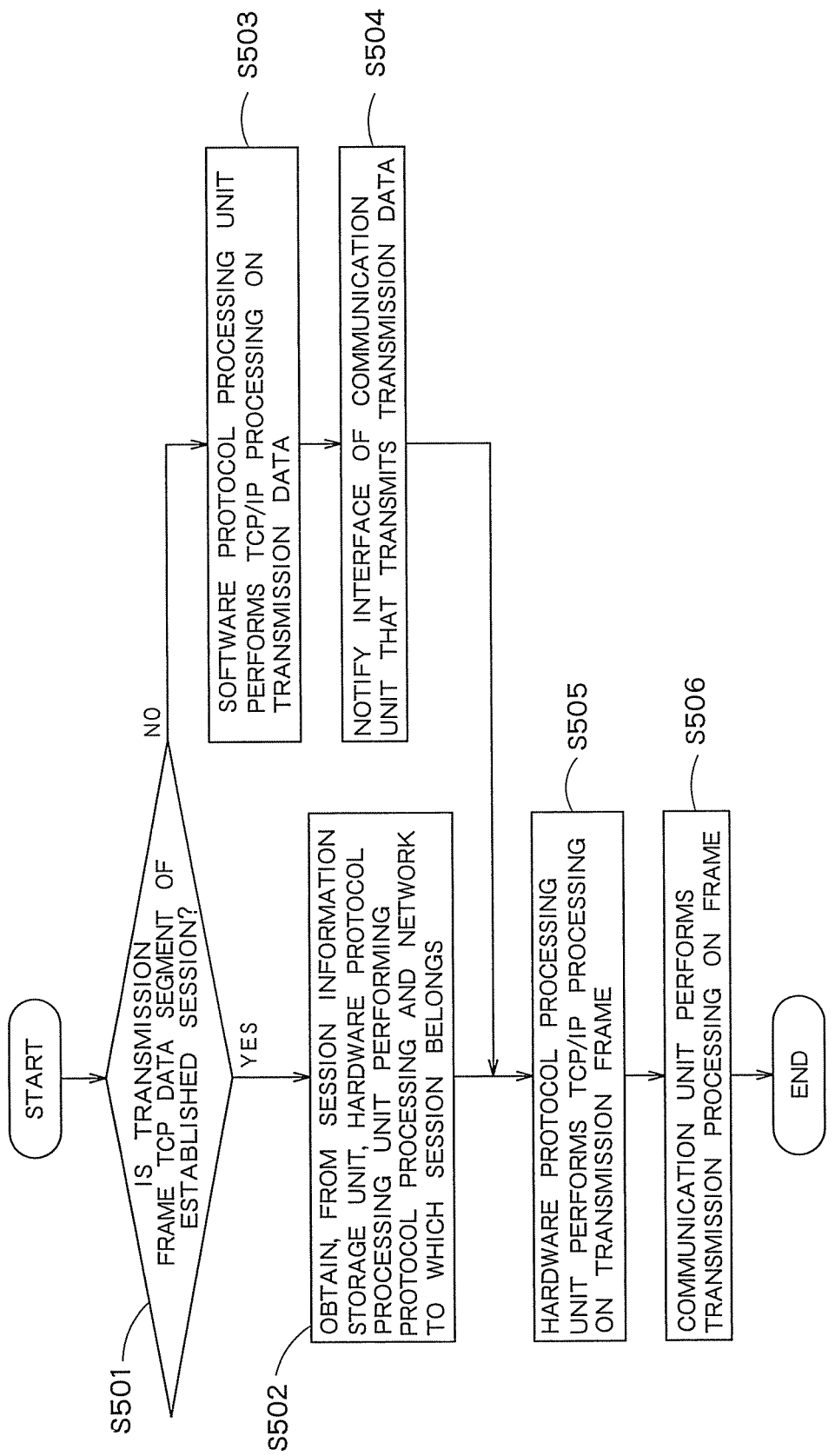
FIG. 13 is a flowchart illustrating transmission processing performed by the data communication apparatus according to the fourth embodiment.

Subsequently, the transmission processing performed by the data communication apparatus 60 will be explained with reference to a flowchart as illustrated in FIG. 13.

(Step S501) A determination is made as to whether data to be transmitted is data for the session currently established. If the data is TCP data for the session currently established, step S502 is subsequently performed. If the data is not TCP data for the session currently established but is an ARP packet, a TCP segment including a SYN flag for establishing a TCP session, and the like, step S503 is subsequently performed.

(Step S502) An identifier indicating a hardware protocol processing unit 63 or 64 that performs the protocol processing and an identifier indicating an interface of a communication unit that performs the transmission processing are obtained from the session information storage unit 66.

(Step S503) The software protocol processing unit 65 performs TCP/IP processing.

(Step S504) The software protocol processing unit 65 has a routing processing function. The software protocol processing unit 65 determines a network segment to which the transmission data is to be transmitted based on the destination IP address, and notifies the hardware protocol processing unit of the identifier indicating the interface of the communication unit for the determined network segment.

(Step S505) The hardware protocol processing unit 63 or 64 performs TCP data transmission processing, IPv4 transmission processing, and Ethernet transmission processing. If the software protocol processing unit 65 performs protocol processing, the hardware protocol processing unit 63 or 64 performs TCP/IP processing of transmission frames which are not processed by the software protocol processing unit 13. When the protocol processing is finished, the frame is output to an obtained or instructed medium access processing unit.

(Step S506) The communication unit 61 or 62 outputs the transmission frame to the destination apparatus.

Figure 14:
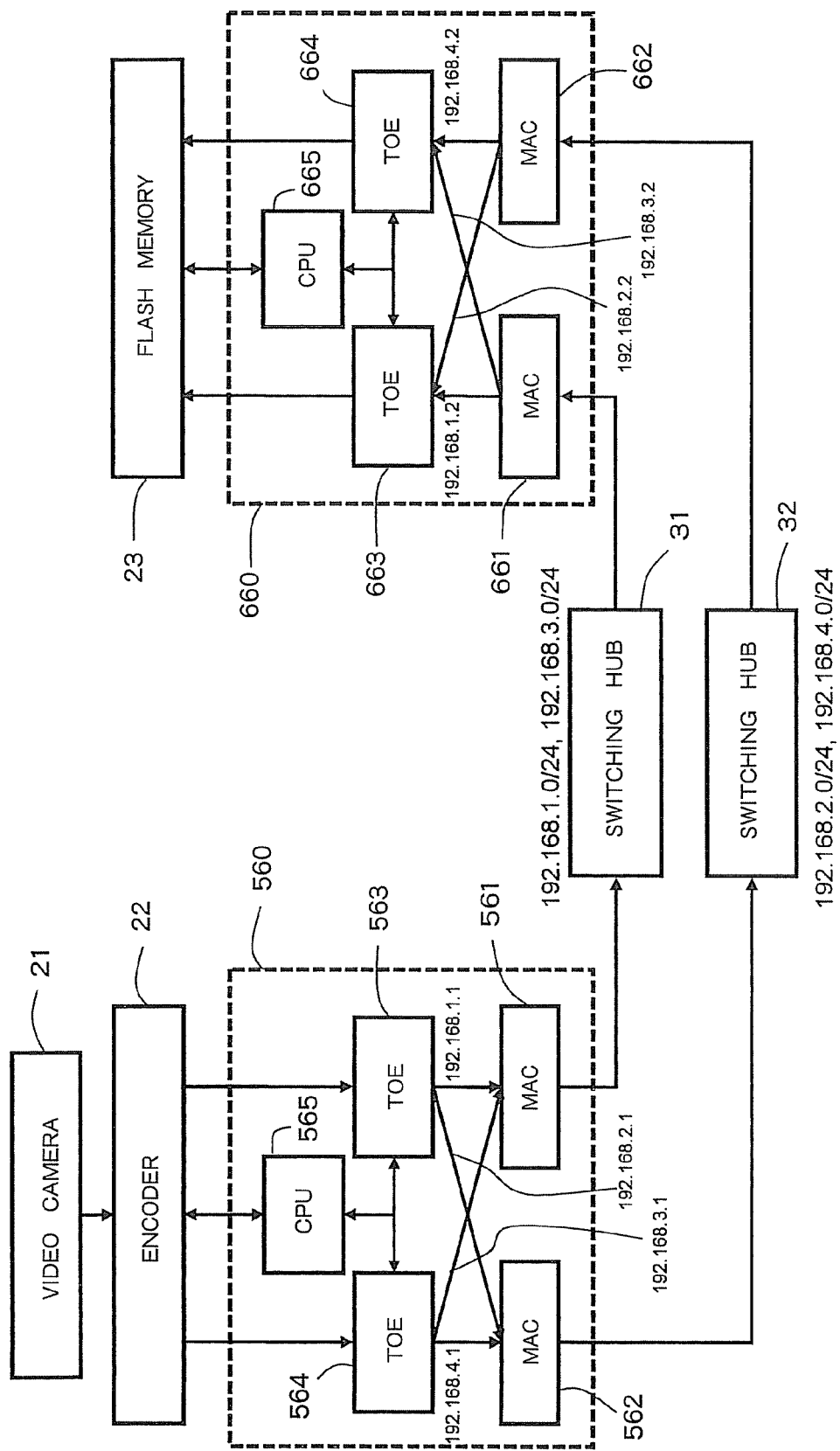
FIG. 14 is a schematic configuration diagram illustrating a data communication system according to the fourth embodiment.

FIG. 14 illustrates a schematic configuration of a data communication system using the data communication apparatus according to the present embodiment. This data communication system includes a video camera 21, an encoder 22, a flash memory 23, data communication apparatuses 560, 660, and switching hubs 31 and 32. In this system, the encoder 22 encodes a video taken by the video camera 21. The data communication apparatus 560 transmits the encoded video data to the data communication apparatus 660 via a plurality of (in this case, two) switching hubs. The data communication apparatus 660 records the received video data to the flash memory 23. The switching hubs 31, 32 are arranged in the communication paths.

The data communication apparatuses 560, 660 are similar to the data communication apparatus 60 as illustrated in FIG. 11. The data communication apparatus 560 includes MACs 561, 562 corresponding to the communication units 61, 62, MACs 563, 564 corresponding to the hardware protocol processing units 63, 64, and a CPU 565 corresponding to the software protocol processing unit 65. The data communication apparatus 560 also includes constituent elements corresponding to the session information storage unit 66 and the frame information storage unit 67 of the data communication apparatus 60 as illustrated in FIG. 11, but these constituent elements are not illustrated in FIG. 14.

The data communication apparatus 660 includes MACs 661, 662 corresponding to the communication units 61, 62, TOEs 663, 664 corresponding to the hardware protocol processing units 63, 64, and a CPU 665 corresponding to the software protocol processing unit 65. The data communication apparatus 660 also includes constituent elements corresponding to the session information storage unit 66 and the frame information storage unit 67 of the data communication apparatus 60 as illustrated in FIG. 11, but these constituent elements are not illustrated in FIG. 14.

The encoder 22 is connected via the TOEs 563, 564 and the CPU 565 via a bus. The encoder 22 encodes an SD-SDI signal or an HD-SDI signal output from the video camera with motion picture encoding standards such as MPEG-2 and H.264, and outputs the encoded signal to the TOEs 563, 564. The TOE 563 is connected, by means of Ethernet, to the switching hubs 31, 32 via the MACs 561, 562 each structured with different hardware. Likewise, the TOE 564 is connected, by means of Ethernet, to the switching hubs 31, 32 via the MACs 561, 562. The TOEs 563, 564 have hardware (serializer) for serializing and processing frames received from the two MACs 561, 562.

The flash memory 23 is connected to the TOEs 663, 664 and the CPU 665 via a bus. The TOE 663 is connected, by means of Ethernet, to the switching hubs 31, 32 via the MACs 661, 662 each structured with different hardware. Likewise, the TOE 664 is connected, by means of Ethernet, to the switching hubs 31, 32 via the MACs 661, 662. The TOEs 663, 664 have hardware (serializer) for serializing and processing frames received from the two MACs 661, 662.

As illustrated in FIG. 14, addresses assigned to a network constituted by the switching hub 31 is 192.168.1.0/24 and 192.168.3.0/24. Addresses assigned to a network constituted by the switching hub 32 is 192.168.2.0/24 and 192.168.4.0/24. An IP address assigned to the side of the MAC 560 of the TOE 563 is 192.168.1.1. An IP address assigned to the side of the MAC 562 of the TOE 563 is 192.168.2.1. An IP address assigned to the side of the MAC 561 of the TOE 564 is 192.168.3.1. An IP address assigned to the side of the MAC 562 of the TOE 564 is 192.168.4.1. On the other hand, an IP address assigned to the side of the MAC 661 of the TOE 663 is 192.168.1.2. An IP address assigned to the side of the MAC 662 of the TOE 663 is 192.168.2.2. An IP address assigned to the side of the MAC 661 of the TOE 664 is 192.168.3.2. An IP address assigned to the side of the MAC 662 of the TOE 664 is 192.168.4.2.

In this system, TCP is used to transmit the video stream output from the encoder 22 to the flash memory 23. First, a TCP session is established by the side of the encoder 22 in order to transfer the video stream by TCP. In order to establish a session, it is necessary to obtain the MAC (Media Access Control) address of the destination in advance.

First, the software operating on the CPU 565 performs generation processing of an ARP request packet for resolving the IP address of the destination, i.e., 192.168.1.2, to a MAC address in order to obtain the MAC address of the destination of transmission. There are two MACs capable of outputting frames, but it is known that the IP address resolved in this example exists in the network to which the MAC 561 belongs. Therefore, the CPU 114 uses a descriptor to cause the TOE 563 to perform Ethernet transmission processing and instructs the TOE 563 to transmit a frame via the MAC 561. If it is not known which of the networks the IP address belongs to, the frame may be transmitted from all of the connected MACs.

Like the descriptor explained in the first embodiment, the descriptor according to the present embodiment includes fields of DESCRIPTOR_TYPE, NETWORK_ID, BUFFER_ADDRESS, and PROCESS_DONE. However, a different content is specified to NETWORK_ID. If DESCRIPTOR_TYPE indicates that the descriptor is a transmission instruction given by the CPU to the TOE, the CPU specifies, as NETWORK_ID, identifiers of the MAC and the TOE, i.e., identifiers of a network to which a frame is transmitted. On the other hand, if DESCRIPTOR_TYPE indicates that the descriptor is a frame reception instruction given by the TOE to the CPU, the TOE specifies, as NETWORK_ID, identifiers of the MAC and the TOE, i.e., identifiers of a network from which a frame is received.

If the CPU 565 transmits an ARP request packet, the CPU 565 stores, to DESCRIPTOR_TYPE of the descriptor, a value indicating a transmission instruction. The CPU 565 stores, to NETWORK_ID, identifies of the MAC 561 and the TOE 563. The CPU 565 stores, to BUFFER_ADDRESS, an address of the shared memory at which the transmission frame is stored. The CPU 565 stores, to PROCESS_DONE, information indicating that the processing of ARP is completed.

As described above, the ARP request packet transmitted from the CPU 565 is received by the MAC 661 via the switching hub 31. The TOE 663 performs Ethernet reception processing on the frame received by the MAC 661. The TOE 610 uses the descriptor to transmit information about the reception frame to the CPU 665 in order to process the ARP, i.e., higher-level protocol. In this case, DESCRIPTOR_TYPE has a value indicating a reception instruction. NETWORK_ID has identifiers indicating the MAC 661 and the TOE 663. BUFFER_ADDRESS has an address of the shared memory at which the reception frame is stored. PROCESS_DONE has information indicating that the Ethernet processing is completed.

The software operating on the CPU 665 performs ARP reception processing of the reception frame obtained from the descriptor, and generates an ARP response packet. Then, the CPU 665 uses the descriptor to instruct the TOE 663 to transmit the ARP response packet via the network from which the frame has been received. At this occasion, DESCRIPTOR_TYPE has a value indicating a transmission instruction. NETWORK_ID has the identifiers indicating the MAC 661 and the TOE 663, i.e., a network from which the ARP request packet is received. BUFFER_ADDRESS has an address of the shared memory at which the ARP response packet generated by the CPU 665 is stored. The TOE 663, having received the instruction, performs the Ethernet transmission processing, and thereafter, the frame is transmitted via the MAC 661. Thus, the ARP response packet is transmitted via the TOE 663 and the MAC 661.

When the TOE 563 receives the frame (ARP response packet) via the switching hub 31 and the MAC 561, the TOE 563 performs Ethernet reception processing, and uses the descriptor to instruct the CPU 565 to perform reception processing. The TOE 564 also receives the same frame. However, since the frame has an IP address and a MAC address different from those defined as receivable addresses, the frame is discarded. The CPU 565 can obtain the MAC address corresponding to the IP address assigned to the side of the MAC 661 of the TOE 663 by receiving this ARP response packet.

As described above, for each frame, the CPU and the TOE notify each other of a network from which a frame is received or a network to which a frame is transmitted, whereby communication can be performed using the plurality of TOEs connected to the plurality of MACs.

The software operating on the CPU 565 uses the MAC address obtained by the above method to transmit a TCP session establishing request segment including a SYN flag via the TOE 563 and the MAC 561 in order to establish a session between 192.168.1.1 and 192.168.1.2.

The TCP session establishment segment having reached the MAC 661 via the switching hub 31 is subjected to frame reception processing performed by the MAC 661, and is subjected to Ethernet reception processing, IPv4 reception processing, and TCP data reception processing performed by the TOE 663. Then, the TOE 663 uses the descriptor to notify information about the reception frame to the CPU 665. The CPU 665 processes the segment including the SYN flag of TCP. If the CPU 665 can accept the segment including the SYN flag, the CPU 665 generates a segment including the SYN flag and an ACK flag, and uses the descriptor to transmit information about the transmission frame to the TOE 663.

The TOE 663 performs TCP data processing, IPv4 transmission processing, and Ethernet transmission processing, and transmits the frame via the MAC 661. The segment including the SYN flag and the ACK flag is received by the MAC 561 via the switching hub 31. The TOE 563 performs Ethernet reception processing, IPv4 reception processing, and TCP reception data processing on the reception frame on the frame received by the MAC 561. The CPU 565 performs reception processing on the segment including the SYN flag and the ACK flag. When this segment is acceptable, the CPU 565 generates session information to establish a session, the CPU 565 causes the session information storage unit (not illustrated) to store NETWORK_ID, set in the descriptor by which the frame is received, as a network to which the session belongs.

The CPU 565 generates a TCP segment including an ACK flag, and transmits a frame via the TOE 563 and the MAC 561. This frame is received by the TOE 663 via the switching hub 31 and the MAC 661, and the TOE 663 uses the descriptor to transmit information about the frame to the CPU 665. When the CPU 665 performs session establishing processing, the CPU 665 causes the session information storage unit (not illustrated) to store NETWORK_ID, set in the descriptor by which the frame is received, as a network to which the session belongs.

Likewise, the software operating on the CPU 565 uses ARP to resolve 192.168.2.1 to 192.168.2.2, 192.168.3.1 to 192.168.3.2, 192.168.4.1 to 192.168.4.2 to corresponding MAC addresses, and establishes TCP sessions. Alternatively, instead of initiating a TCP session establishment by the encoder 22, a TCP session establishment may be initiated by the flash memory 23 according to the above method.

As described above, when four sessions are established between the encoder 22 and the flash memory 23, the encoder 22 encodes an input provided by the video camera 21. For the output data provided by the encoder 22, totally four sessions are used. The four sessions include two sessions of the TOE 563 and two sessions of the TOE 564. TCP transmission processing starts with these four sessions.

It should be noted that the TOEs 563, 564 have the same configuration as the TOE 113 as illustrated in FIG. 6. The TOEs 563, 564 preferentially transmit data corresponding to a buffer, arranged at a stage prior to the MAC, whose remaining buffer capacity is determined to be more than the predetermined size.

As described above, transmitted TCP data segments are subjected to the reception processing by the TOE 663 and the TOE 664, and are written to different storage regions of the flash memory 23 for each session. When all the data transfer is finished, the encoder 22 and the flash memory 23 transmit segments including FIN flags, and performs TCP session termination processing. When the termination of the session is accepted, the session information in the session information storage unit is discarded.

After the session termination processing, the flash memory 23 keeps a normally received stream and discards the other stream. When a failure occurs in a communication path, the TOEs 563, 564 cannot perform transmission, which causes a buffer in the encoder 22 to overflow. Therefore, one of the files that has a larger file size may be determined to be a normally received.

Each of the data communication apparatuses 560, 660 includes the two TOEs. Therefore, even when one of the TOEs malfunctions, the other of the TOEs can perform communication via the plurality of networks.

As described above, according to the data communication apparatus according to the present embodiment, the two TOEs and the two MACs are used to perform communication via the four networks. Therefore, a video stream can be transmitted at a fast speed without any loss while guaranteeing against malfunction of the TOEs. Further, each of the MAC and the TOE is independently connected, which improves resistance against malfunction of each apparatus compared with transmission via two communication paths. Moreover, it is not necessary to arrange as many TOEs as the number of communication paths, and the cost can be reduced. Therefore, the speed and the reliability of data communication can be improved at a low cost.

The example of the present embodiment is constituted by the two hardware offload engines and the two MACs. However, the number of hardware offload engines and the number of MACs are not limited two. As long as a plurality of offload engines and a plurality of MACs are arranged, the reliability can be improved in the same manner.

In the example of the present embodiment, the video stream output from one encoder is transmitted via the plurality of communication paths. The number of encoders may be increased, so as to improve the reliability.

The hardware protocol processing units 13, 63, 64 of the data communication apparatus according to the first to fourth embodiments may include not only TCP and UDP protocols but also protocols such as SCTP (Stream Control Transmission Protocol), DCCP (Datagram Congestion Control Protocol), RTP (Real-time Transport Protocol), and IPv6 (Internet Protocol Version 6).

In the examples of the above embodiments, the communication path of the data communication apparatus is formed by way of only one switching hub. However, the communication path may be constituted by a plurality of switching hubs, or may be formed by way of a router. Further, a MAC and a switching hub may be connected by PHY, or may be connected by standards such as SGMII (Serial Gigabit Media Independent Interface).

In above embodiments, the flash memory is used as an example of the recording medium. However, a hard disk, a magnetic tape, and the like may be used as the recording medium.

At least part of the data communication apparatus described in the above embodiments may be implemented in either hardware or software. When implemented in software, a program that realizes at least part of functions of the data communication apparatus may be stored on a recording medium such as a flexible disk or CD-ROM and read and executed by a computer. The recording medium is not limited to a removable recording medium such as a magnetic disk or optical disk, but may be a non-removable recording medium such as a hard disk device or memory.

The program that realizes at least part of the functions of the data communication apparatus may be distributed through a communication line (including wireless communications) such as the Internet. Further, the program may be encrypted, modulated, or compressed to be distributed through a wired line or wireless line such as the Internet or to be distributed by storing the program on a recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data communication apparatus comprising:
a communication unit which transmits a transmission frame and receives a reception frame via a plurality of networks;
a first storage unit which stores a first identifier indicating which physical communication unit has received the reception frame or a second identifier indicating which physical communication unit transmits the transmission frame;
a first processing unit which performs, using hardware, network protocol processing on the reception frame and writes the first identifier to the first storage unit, and performs, using hardware, network protocol processing on the transmission frame and reads the second identifier from the first storage unit; and
a second processing unit which performs, using software, network protocol processing on the transmission frame and writes the second identifier to the first storage unit, and perform, using software, network protocol processing on the reception frame and reads the first identifier from the first storage unit,
wherein the communication unit includes a plurality of communication units for performing transmission and reception with the plurality of different networks,
the first identifier is an identifier indicating a communication unit which receives a frame,
the second identifier is an identifier indicating a communication unit which transmits a frame,
the first processing unit stores the first identifier in association with an address of the memory in which the reception frame is stored,
the second processing unit reads the first identifier and the reception frame from the first storage unit, generates the transmission frame as a response to the reception frame, stores the first identifier as the second identifier in association with an address of the memory in which the transmission frame is stored; and
the plurality of communication units are physical communication units,
the first processing unit identifies a communication unit which has received the reception frame, generates an identifier corresponding to the identified communication unit and writes the generated identifier as the first identifier to the first storage unit.

2. The data communication apparatus according to claim 1, further comprising a second storage unit which stores session information indicating an established session and a third identifier indicating a network corresponding to the session,
wherein the first processing unit determines whether a session corresponding to the transmission frame is established or not based on the session information, and when the session corresponding to the transmission frame is determined to be established, the first processing unit obtains the third identifier corresponding to the session from the second storage unit, and the first processing unit uses the obtained third identifier to perform the network protocol processing on the transmission frame.

3. The data communication apparatus according to claim 2, wherein the first processing unit determines whether a session corresponding to the reception frame is established or not based on the session information, and when the session corresponding to the reception frame is determined not to be established, the first processing unit writes the first identifier to the first storage unit,
wherein the second processing unit reads the first identifier from the first storage unit to perform the network protocol processing on the reception frame, and when a session is determined to be established as a result of the processing, the first identifier is written to the second storage unit.

4. The data communication apparatus according to claim 1, wherein the communication unit receives data attached with a sequence number via the plurality of networks,
and the first processing unit analyzes the sequence number, and performs reception processing only on data having a correct checksum calculation result of at least one of the data received via the plurality of networks.

5. The data communication apparatus according to claim 1, wherein the communication unit includes a plurality of pieces of hardware for transmitting and receiving frames via the respective networks.

6. The data communication apparatus according to claim 5, wherein the first processing unit includes:
a reception unit which receives a data transmission request from the second processing unit;
a plurality of transmission queue units which are arranged to respectively correspond to the plurality of pieces of hardware included in the communication unit, and which place data transmission requests for the corresponding pieces of hardware into queues;
an instruction unit which retrieves the data transmission request placed in the queue of the transmission queue unit, and outputs a transmission instruction based on the data transmission request;
a generation unit which generates a transmission frame based on the transmission instruction; and
a selection unit which gives the transmission frame to a frame buffer corresponding the piece of hardware that transmits the transmission frame,
wherein the instruction unit checks a remaining buffer capacity of the frame buffer, and preferentially retrieves the data transmission request from the transmission queue unit corresponding to the frame buffer whose remaining buffer capacity is equal to or more than a predetermined size.

7. The data communication apparatus according to claim 5, wherein the first processing unit includes:
a reception unit which receives a data transmission request from the second processing unit;
a transmission queue unit which places the data transmission request received by the reception unit into queues;
a generation unit which generates a transmission frame based on the data transmission instruction placed into the queue by the transmission queue unit;
a transmission unit which transmits the transmission frame to the plurality of pieces of hardware included in the communication unit; and
an instruction unit,
wherein, if the generation unit generates a new transmission frame based on a data transmission request newly placed in the queue by the transmission queue unit while the transmission unit is transmitting a transmission frame to only one of the plurality of pieces of hardware capable of receiving the transmission frame, the instruction unit instructs the transmission unit to discard the transmission frame being transmitted and to start transmission of the new transmission frame.

8. The data communication apparatus according to claim 5, wherein the first processing unit includes:
a reception unit which receives a data transmission request from the second processing unit;
a transmission queue unit which places the data transmission request received by the reception unit into queues;
a generation unit which generates a transmission frame based on the data transmission instruction placed into the queue by the transmission queue unit;
a transmission unit which transmits the transmission frame to the plurality of pieces of hardware included in the communication unit; and
an instruction unit,
wherein the instruction unit monitors a frame transmission time of the transmission unit, and if the frame transmission time exceeds a predetermined time while the transmission unit is transmitting the transmission frame to only the piece of hardware capable of receiving the transmission frame, the instruction unit instructs the transmission unit to discard the transmission frame being transmitted and to start transmission of a new transmission frame.

9. The data communication apparatus according to claim 1, wherein the first processing unit includes a plurality of hardware protocol processing units which perform the network protocol processing with hardware,
wherein the first identifier is an identifier indicating a hardware protocol processing unit further performing the network protocol processing on the reception frame, and
the second identifier is an identifier indicating a hardware protocol processing unit further performing the network protocol processing on the transmission frame.

10. A data communication method performed by a data communication apparatus including a plurality of physical communication units which perform transmission and reception with a plurality of different networks, a storage unit, a first processing unit, and a second processing unit, the data communication method comprising:
causing one of the plurality of physical communication units to receive a reception frame;
causing the first processing unit to perform, using hardware, network protocol processing on the reception frame, and write a first identifier indicating a physical communication unit which receives the reception frame in association with an address of the memory in which the reception frame is stored;
causing the second processing unit to read the first identifier and the reception frame from the storage unit, perform the network protocol processing on the reception frame using software to generate a transmission frame as a response to the reception frame, and write the first identifier as a second identifier indicating a physical communication unit which transmits the transmission frame in association with an address of the memory in which the transmission frame is stored;
causing the first processing unit to read the second identifier and the transmission frame from the storage unit, and perform network protocol processing on the transmission frame using hardware; and
causing the first processing unit to identify a communication unit which has received the reception frame, generate an identifier corresponding to the identified communication unit and write the generated identifier as the first identifier to the first storage unit.

11. A non-transitory computer-readable storage medium storing a program which causes a data communication apparatus, the apparatus comprising a plurality of physical communication units which perform transmission and reception with a plurality of different networks, a storage unit, a first processing unit, and a second processing unit, to execute the steps of:
   causing one of the plurality of physical communication units to receive a reception frame;
   causing the first processing unit to perform, using hardware, network protocol processing on the reception frame, and write a first identifier indicating a physical communication unit which receives the reception frame in association with an address of the memory in which the reception frame is stored;
   causing the second processing unit to read the first identifier and the reception frame from the storage unit, perform the network protocol processing on the reception frame using software to generate a transmission frame as a response to the reception frame, and write the first identifier as a second identifier indicating a physical communication unit which transmits the transmission frame in association with an address of the memory in which the transmission frame is stored; and
   causing the first processing unit to read the second identifier and the transmission frame from the storage unit, and perform network protocol processing on the transmission frame using hardware;
   causing the first processing unit to identify a communication unit which has received the reception frame, generate an identifier corresponding to the identified communication unit and write the generated identifier as the first identifier to the first storage unit.

12. A data processing apparatus configured to exchange data with a plurality of physical communication devices which perform transmission and reception with a plurality of different networks and a storage device which stores a first identifier indicating a physical communication device which receives a reception frame and a second identifier indicating a physical communication device which transmits a transmission frame, the data processing apparatus comprising:
   a first processing unit which performs, using hardware, network protocol processing on the reception frame and writes the first identifier to the storage device, reads the second identifier from the storage device, and performs network protocol processing on the transmission frame using hardware; and
   a second processing unit which performs, using software, network protocol processing on the transmission frame and writes the second identifier to the storage device, reads the first identifier from the storage device, and performs network protocol processing on the reception frame using software,
   wherein the first processing unit writes the first identifier in association with an address of the memory in which the reception frame is stored, and
   the second processing unit reads the first identifier and the reception frame from the storage device, generates the transmission frame as a response to the reception frame, writes the first identifier as the second identifier in association with an address of the memory in which the transmission frame is stored,
   the first processing unit identifies a communication unit which has received the reception frame, generates an identifier corresponding to the identified communication unit and writes the generated identifier as the first identifier to the first storage unit.

* * * * *